US012464972B2

(12) United States Patent
Riffel et al.

(10) Patent No.: US 12,464,972 B2
(45) Date of Patent: Nov. 11, 2025

(54) SEED-FLOW ADJUSTMENT SYSTEM

(71) Applicant: Great Plains Manufacturing, Inc., Salina, KS (US)

(72) Inventors: Jacob R. Riffel, Salina, KS (US); Gregory W. Arnett, Solomon, KS (US); Verne A. Hubalek, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 207 days.

(21) Appl. No.: 18/366,225

(22) Filed: Aug. 7, 2023

(65) Prior Publication Data

US 2023/0371420 A1     Nov. 23, 2023

Related U.S. Application Data

(63) Continuation of application No. 16/536,877, filed on Aug. 9, 2019.

(Continued)

(51) Int. Cl.
    *A01C 7/08*        (2006.01)
    *A01C 7/10*        (2006.01)

(52) U.S. Cl.
    CPC .............. *A01C 7/105* (2013.01); *A01C 7/082* (2013.01)

(58) Field of Classification Search
None
See application file for complete search history.

(56) References Cited

U.S. PATENT DOCUMENTS 4,874,130 A    10/1989   Wondergem
5,028,009 A *   7/1991   Takata ................... A01C 7/087
                                          239/689

(Continued)

FOREIGN PATENT DOCUMENTS

EP        2717668        4/2016
EP        2932818        8/2018

(Continued)

OTHER PUBLICATIONS

Strong, Innovative Toolbars, https://www.seedmaster.ca/toolbars.php, SeedMasterMfg, 14 pages.

(Continued)

*Primary Examiner* — Joseph A Dillon, Jr.
(74) *Attorney, Agent, or Firm* — Hovey Williams LLP; Kameron D. Kelly

(57) ABSTRACT

A distribution tower comprising an upright conduit for pneumatically conveying particulate material in a primary stream. The tower additionally includes a distribution head at the upper end of the conduit, with the distribution head comprising a plenum chamber for receiving the primary stream of particulate material from the conduit. The distribution head further comprises a plurality of discharge outlets for directing particulate material out of the plenum chamber by splitting the primary stream into a plurality of secondary streams. Each of the secondary streams is discharged from the distribution head via one of the discharge outlets. The tower additionally includes a flow adjustment system configured to adjust a distribution of particulate material between the secondary streams without completely restricting the flow of any of the secondary streams through their respective discharge outlet. The tower further includes a control system for controlling operation of said flow adjustment system.

17 Claims, 15 Drawing Sheets

Related U.S. Application Data

(60) Provisional application No. 62/717,103, filed on Aug. 10, 2018.

(56) References Cited

U.S. PATENT DOCUMENTS

| | | | |
|---|---|---|---|
| 5,074,228 | A | 12/1991 | Daws |
| 6,273,648 | B1 | 8/2001 | Poncelet et al. |
| 6,290,433 | B2 | 9/2001 | Poncelet et al. |
| 8,656,848 | B2 | 2/2014 | Hubalek et al. |
| 8,821,078 | B2 | 9/2014 | Hockett et al. |
| 8,894,330 | B2 | 11/2014 | Gluch et al. |
| 8,955,445 | B2 | 2/2015 | Riffel |
| 9,781,875 | B2 | 10/2017 | Riffel |
| 9,888,622 | B2 | 2/2018 | Henry |
| 10,051,781 | B2 | 8/2018 | Beaujot |
| 10,172,277 | B2 | 1/2019 | Thompson |
| 10,321,624 | B2 | 6/2019 | Reich et al. |
| 10,773,904 | B2 | 9/2020 | Peterac et al. |
| 10,779,460 | B2 | 9/2020 | Pirkenseer |
| 11,352,222 | B2 | 6/2022 | Trushin |
| 11,357,163 | B2 | 6/2022 | Frank et al. |
| 11,483,963 | B2 * | 11/2022 | Johnson ................ A01C 7/163 |
| 11,490,558 | B2 * | 11/2022 | Johnson ................ A01C 7/102 |
| 11,516,958 | B2 * | 12/2022 | Johnson ................ A01C 7/20 |
| 11,523,555 | B2 * | 12/2022 | Johnson ................ A01C 7/20 |
| 11,523,556 | B2 * | 12/2022 | Johnson ................ A01C 7/20 |
| 11,553,638 | B2 * | 1/2023 | Johnson ................ A01C 7/105 |
| 11,553,639 | B2 * | 1/2023 | Johnson ................ A01C 7/0445 |
| 11,564,344 | B2 * | 1/2023 | Johnson ................ A01C 7/046 |
| 11,564,346 | B2 * | 1/2023 | Johnson ................ A01C 7/0443 |
| 11,582,899 | B2 * | 2/2023 | Johnson ................ A01C 7/0445 |
| 11,589,500 | B2 * | 2/2023 | Johnson ................ A01C 7/20 |
| 11,596,095 | B2 * | 3/2023 | Johnson ................ A01C 7/20 |
| 12,114,594 | B2 * | 10/2024 | Li ................ A01C 15/04 |
| 2011/0035163 | A1 * | 2/2011 | Landphair ................ A01C 7/105 |
| | | | 702/45 |
| 2017/0118906 | A1 * | 5/2017 | Beaujot ................ A01C 7/06 |
| 2017/0156258 | A1 * | 6/2017 | Reich ................ A01C 7/084 |
| 2020/0068788 | A1 * | 3/2020 | Frank ................ A01C 7/081 |

FOREIGN PATENT DOCUMENTS

| | | |
|---|---|---|
| EP | 3639643 | 4/2020 |
| JP | 11-030345 | 2/1999 |
| JP | 2002-267031 | 9/2002 |

OTHER PUBLICATIONS

International Search Report and Written Opinion for related PCT Patent Application No. PCT/US2019/045933 dated Nov. 25, 2019, 11 pages.

* cited by examiner

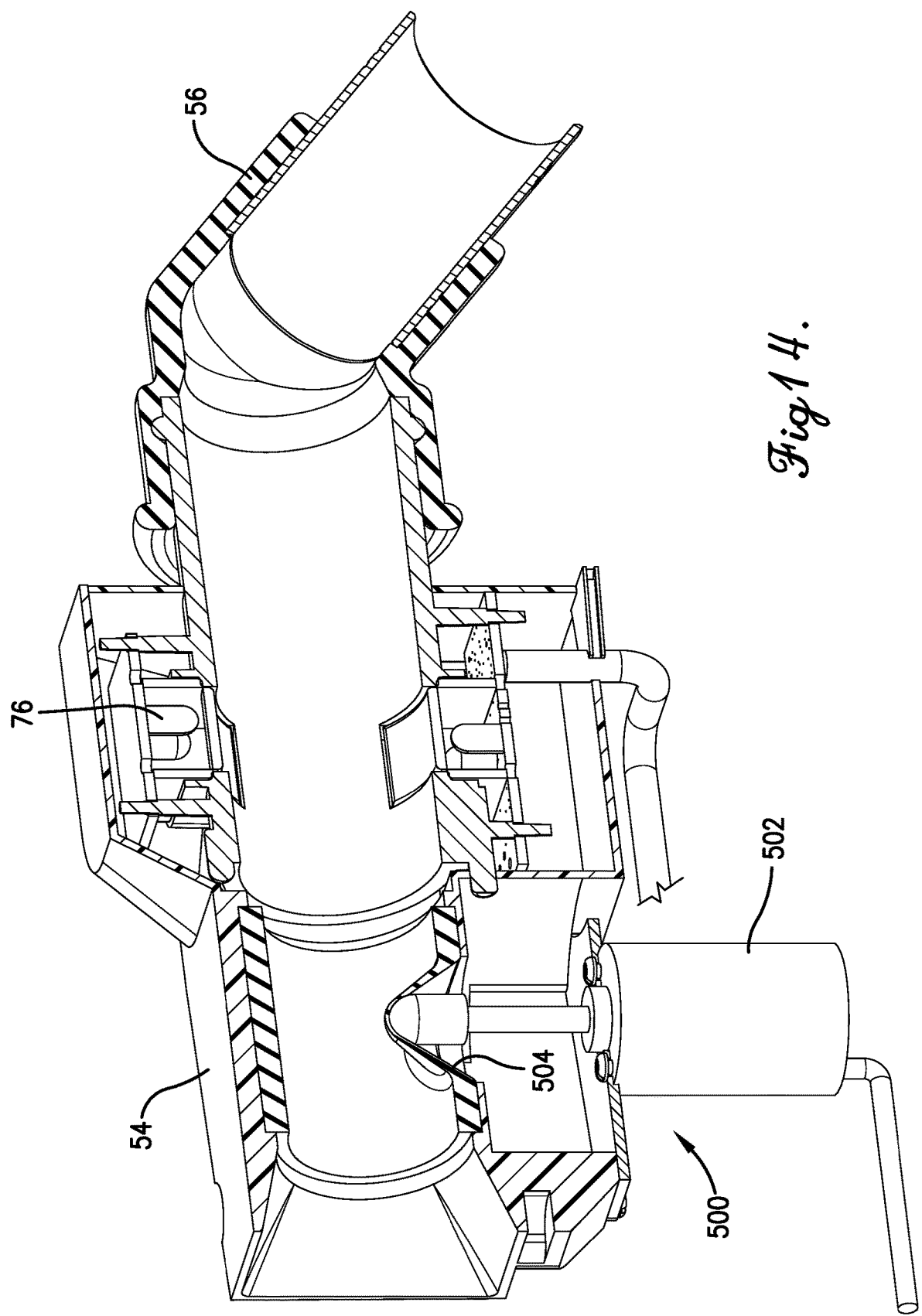

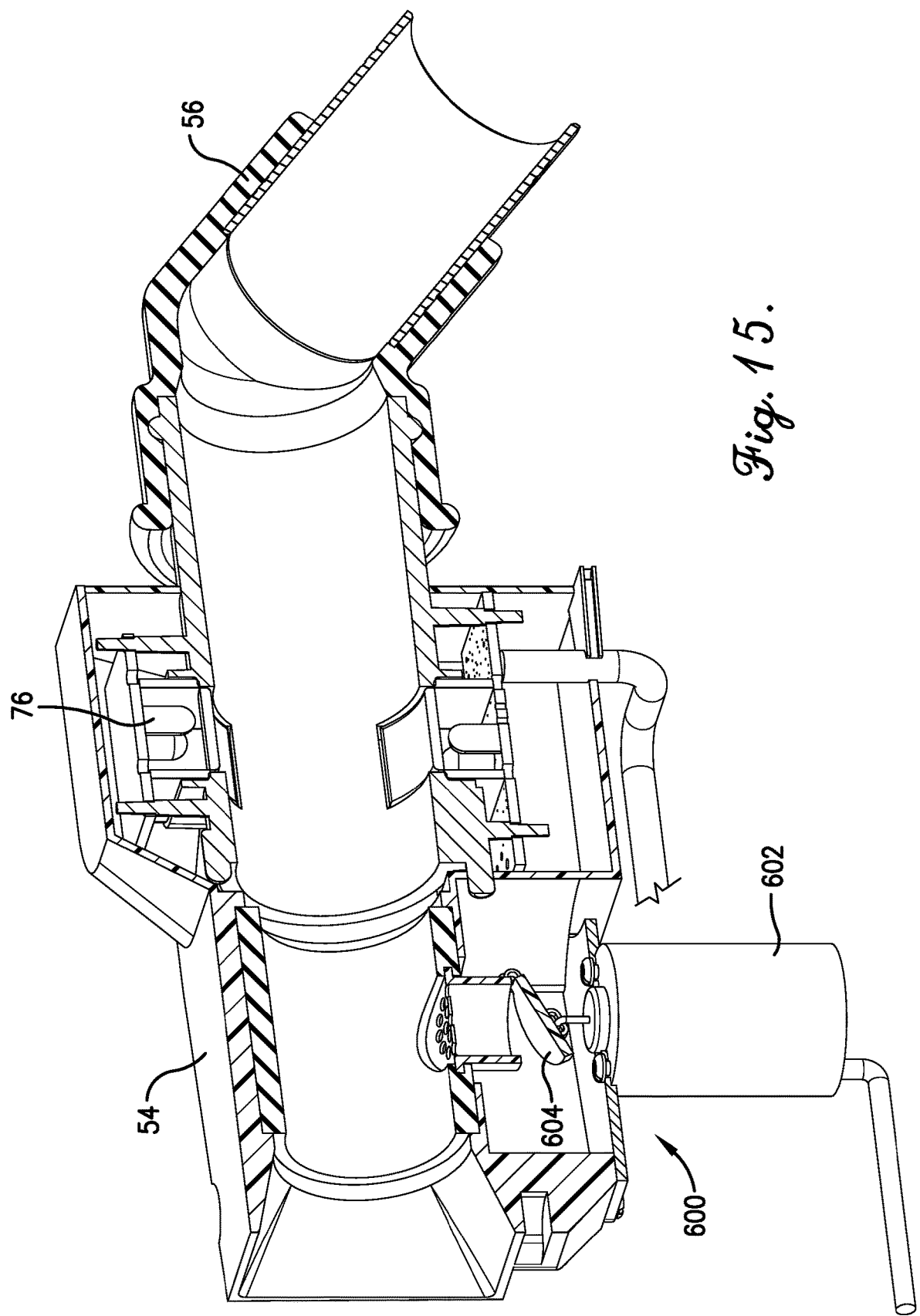

SEED-FLOW ADJUSTMENT SYSTEM

CROSS-REFERENCE TO RELATED APPLICATIONS

The present non-provisional patent application is a continuation patent application to U.S. patent application Ser. No. 16/536,877, filed on Aug. 9, 2019, and entitled "SEED-FLOW ADJUSTMENT SYSTEM," which claims priority to U.S. Provisional Patent Application Ser. No. 62/717,103, filed on Aug. 10, 2018, and entitled "SEED-FLOW ADJUSTMENT SYSTEM," with the entirety of the above-identified, previously-filed applications being hereby incorporated by reference into the present non-provisional continuation patent application.

FIELD OF THE INVENTION

Embodiments of the present invention are generally directed to seed-flow adjustment systems and methods. More particularly, embodiments of the present invention are directed to systems and methods for adjusting the flow of seed through a seed distribution tower.

BACKGROUND OF THE INVENTION

It is well known in the farm equipment industry to meter seeds, or other particulate material, from bulk supply hoppers on a seeder machine into one or more primary air-streams that transport the seeds to a corresponding number of distribution towers. At the distribution towers, each primary stream of air and seeds is divided into a number of secondary streams by way of a distribution head. The secondary streams are then directed to openers on the seeder machine that deposit the seeds into or onto the ground as the seeder machine advances through a field.

As the primary stream of air and seeds travels vertically through the seed distribution tower and enters the distribution head, the seeds are subjected abruptly to an approximately ninety-degree change in direction as they are split into secondary streams and exit the distribution head horizontally. In some cases, a significant amount of turbulence can be been created, which can adversely affect the consistency of the seed distributed among the secondary streams.

Furthermore, in some instances, in may be necessary to adjust the flow of seed among the secondary streams. For example, due to certain variations, such as variations in seed type, air flow through the distribution tower, ground topography (e.g., seeding machine travelling uphill, downhill, on a sidehill, etc.), seed feed rates, etc., seed may not always be flowing properly (e.g., evenly or consistently) through the distribution tower and to the secondary streams.

As such, there is a need for a seed-flow adjustment system capable of adjusting the distribution of seed flowing through a seed distribution tower. In some instances, it may be necessary for seed to be uniformly distributed between the secondary streams formed by the distribution head. Alternatively, it may be necessary to selectively direct more or less seed to one or more of the secondary streams.

SUMMARY OF THE INVENTION

In one embodiment of the present invention, there is provided a distribution tower for distributing particulate material. The distribution tower comprises an upright conduit for pneumatically conveying particulate material in a primary stream toward an upper end of the conduit. The distribution tower additionally includes a distribution head at the upper end of the conduit, with the distribution head comprising a plenum chamber for receiving the primary stream of particulate material from the conduit. The distribution head further comprises a plurality of discharge outlets for directing particulate material out of the plenum chamber, and with the distribution head being configured to split the primary stream into a plurality of secondary streams. Each of the secondary streams is discharged from the distribution head via one of the discharge outlets. The distribution tower additionally includes a flow adjustment system configured to adjust a distribution of particulate material between the secondary streams without completely restricting the flow of any of the secondary streams through their respective discharge outlet. The distribution tower further includes a control system for controlling operation of the flow adjustment system.

In another embodiment of the present invention, there is provided a distribution tower for distributing particulate material. The distribution tower comprises an upright conduit for pneumatically conveying particulate material downstream in a primary stream toward an upper end of the conduit. The distribution tower additionally includes a distribution head at the upper end of the conduit, with the distribution head comprising a plenum chamber for receiving the primary stream of particulate material from the conduit. The distribution head further comprises a plurality of discharge outlets for directing particulate material out of the plenum chamber, with the distribution head being configured to split the primary stream into a plurality of secondary streams. Each of the secondary streams is discharged from the distribution head via one of said discharge outlets. The distribution tower additionally comprise a flow adjustment system configured to adjust, upstream from the discharge outlets, a distribution of particulate material within the secondary streams. The distribution tower further includes a control system for controlling operation of the flow adjustment system.

In another embodiment of the present invention, there is provided a method of distributing particulate material through a distribution tower. The method comprising a step of pneumatically conveying particulate material in a primary stream upward through an upright conduit to a plenum chamber of a distribution head. An additional step includes splitting the particulate material of the primary stream into a plurality of secondary streams that each exit the plenum chamber through a discharge outlet. A further step includes adjusting, via a flow adjustment system controlled by a control system, a distribution of the particulate material among the secondary streams without completely cutting off the flow of any of the secondary streams through their respective discharge outlet.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 14 is a vertical cross section of a discharge outlet for the seed distribution tower from FIG. 3, particularly illustrating embodiments of an air-flow adjustment system in the form of an airflow control assembly comprising an elastic diaphragm and an actuator for adjusting the flow of seed through the discharge outlet; and FIG. 15 is a vertical cross section of a discharge outlet for the seed distribution tower from FIG. 3, particularly illustrating embodiments of an air-flow adjustment system in the form of an airflow control assembly comprising a vent valve and an actuator for adjusting the flow of seed through the discharge outlet.

Figure 1:
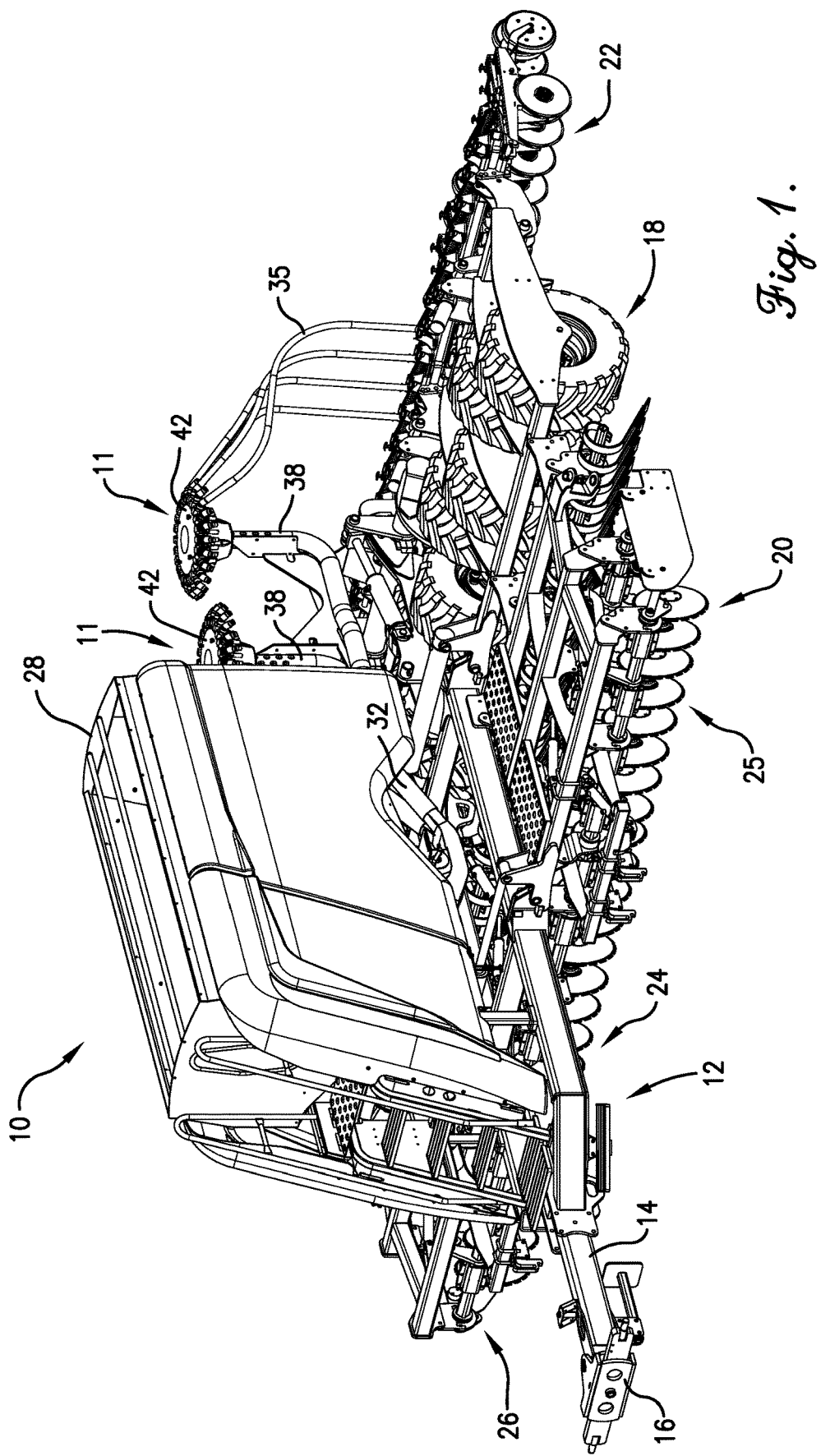
FIG. 1 is a left, front perspective view of a cultivation air seeder utilizing seed distribution towers in accordance with certain embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
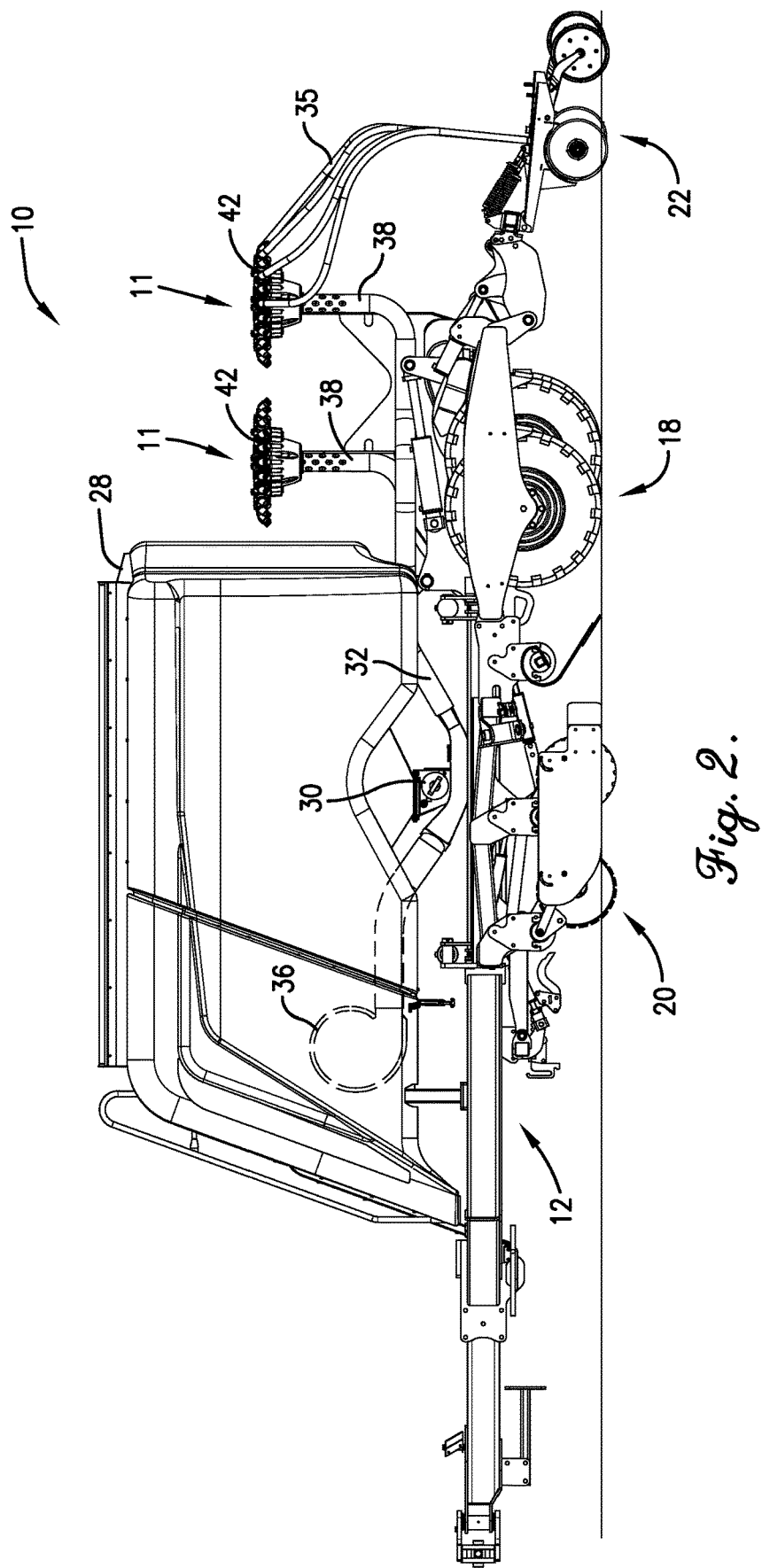
FIG. 2 is a left side elevational view of the seeder from FIG. 1.

Broadly, embodiments of the present invention are directed to seed-flow adjustment systems and methods for adjusting the distribution of seed flow through a distribution tower of a seeder machine. FIGS. 1 and 2 illustrate an exemplary air/pneumatic seeder machine 10 (hereinafter "seeder 10") incorporating one or more seed distribution towers 11 (hereinafter "distribution tower 11") in accordance with embodiments of the present invention. As will be described in more detail below, the distribution towers 11 may include or may be associated with a seed-flow adjustment system for adjusting the distribution of seed flow through the distribution tower 11.

The seeder 10 may include a mobile chassis or frame 12 having a tongue 14 and hitch structure 16 for connecting the seeder 10 to a suitable towing tractor or other vehicle (not shown). A number of ground-engaging wheels 18 may be disposed across the rear of frame 12 to support the frame for over-the-ground travel. In the exemplary disclosed embodiment, seeder 10 comprises a cultivation air seeder and is thus provided with a set of cultivation tools 20 on frame 12 ahead of wheels 18. It will be appreciated, however, that the principles of the present invention may be readily employed on many different types of air seeders and are not limited to use with a cultivation air seeder. A row of openers 22 of any suitable construction well known to those skilled in the art may be supported across the rear of frame 12 behind wheels 18. In the illustrated embodiment, seeder 10 comprises a three-section machine, such that frame 12 has a main frame section 24 and pair of left and right wing frame sections 25, 26 respectively, although the number of frame sections is not of importance insofar as the principles of the present invention are concerned. When applied to various parts of the seeder 10, the terms "left" and "right" are utilized as if the seeder 10 were being viewed from the rear, looking forward (the hitch structure 16 is positioned at the front of the seeder 10).

Seeder 10 further comprises a hopper 28 supported on main frame section 24 for holding a supply of seeds and/or fertilizer or other particulate materials to be distributed to openers 22. Although the illustrated embodiment of the invention will be described in connection with the holding and distribution of seeds by hopper 28, it will be appreciated that the principles of the present invention are not limited to seeds and may, in fact, be utilized in connection with many different kinds of particulate materials.

As perhaps best shown on FIG. 2, a meter 30 at the bottom of hopper 28 may be utilized to dispense seeds at a metered rate into one or more conduits 32 that transport the metered seeds within a primary stream toward the rear of the seeder 10. One or more distribution towers 11 in accordance with the present invention are coupled with conduits 32 downstream from meter 30 for the purpose of dividing each primary stream of seeds into a multiplicity of secondary streams that flow to the openers 22 through secondary hoses 35 (only a limited number being shown in the interest of clarity). A blower 36 adjacent the lower front end of hopper 28 supplies the transporting air for conduits 32 and the secondary hoses 35. As is used herein, the term "downstream" means a direction of air/seed flowing through the seeder 10 away from the blower 36, while "upstream" means a direction of air/seed flowing through the seeder towards the blower 36.

Figure 3:
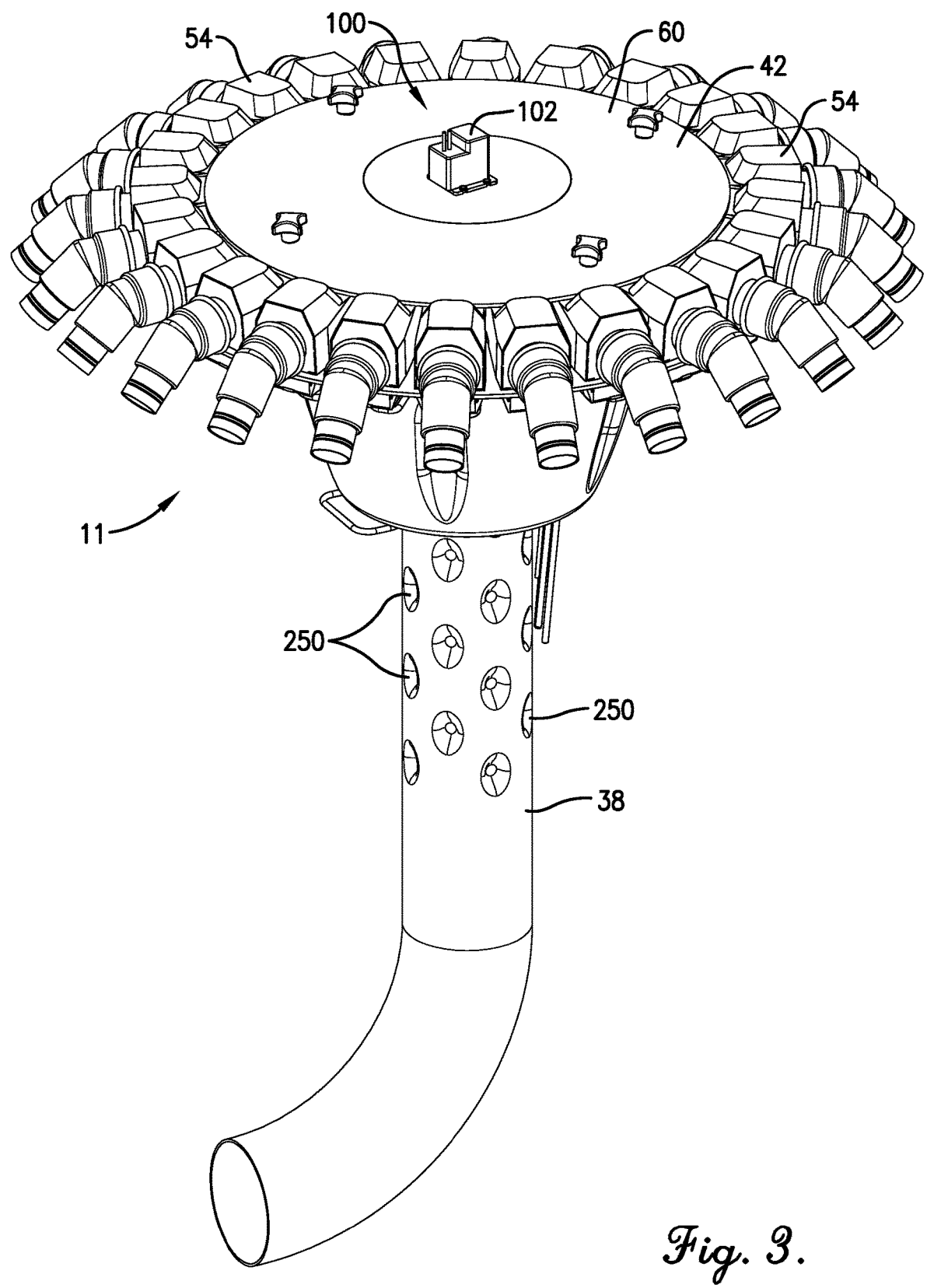
FIG. 3 is an enlarged perspective view of one of the seed distribution towers from the seeder of FIGS. 1 and 2.

A distribution tower is shown in more detail in FIG. 3. Each of the distribution towers 11 may include an upright pipe or conduit 38 fixed to frame 12 and connected at its lower end to the conduit 32 from hopper 28 (See, FIG. 2). A generally cylindrical distribution head 42 may be secured to the upper end of upright conduit 38 for splitting the primary stream of air and seed that flows upward through the upright conduit 38 (from the conduit 32 extending from the hopper 28) into the secondary streams of air and seed that transition the direction of the air and seed flow from generally vertical to generally horizontal.

Figure 4:
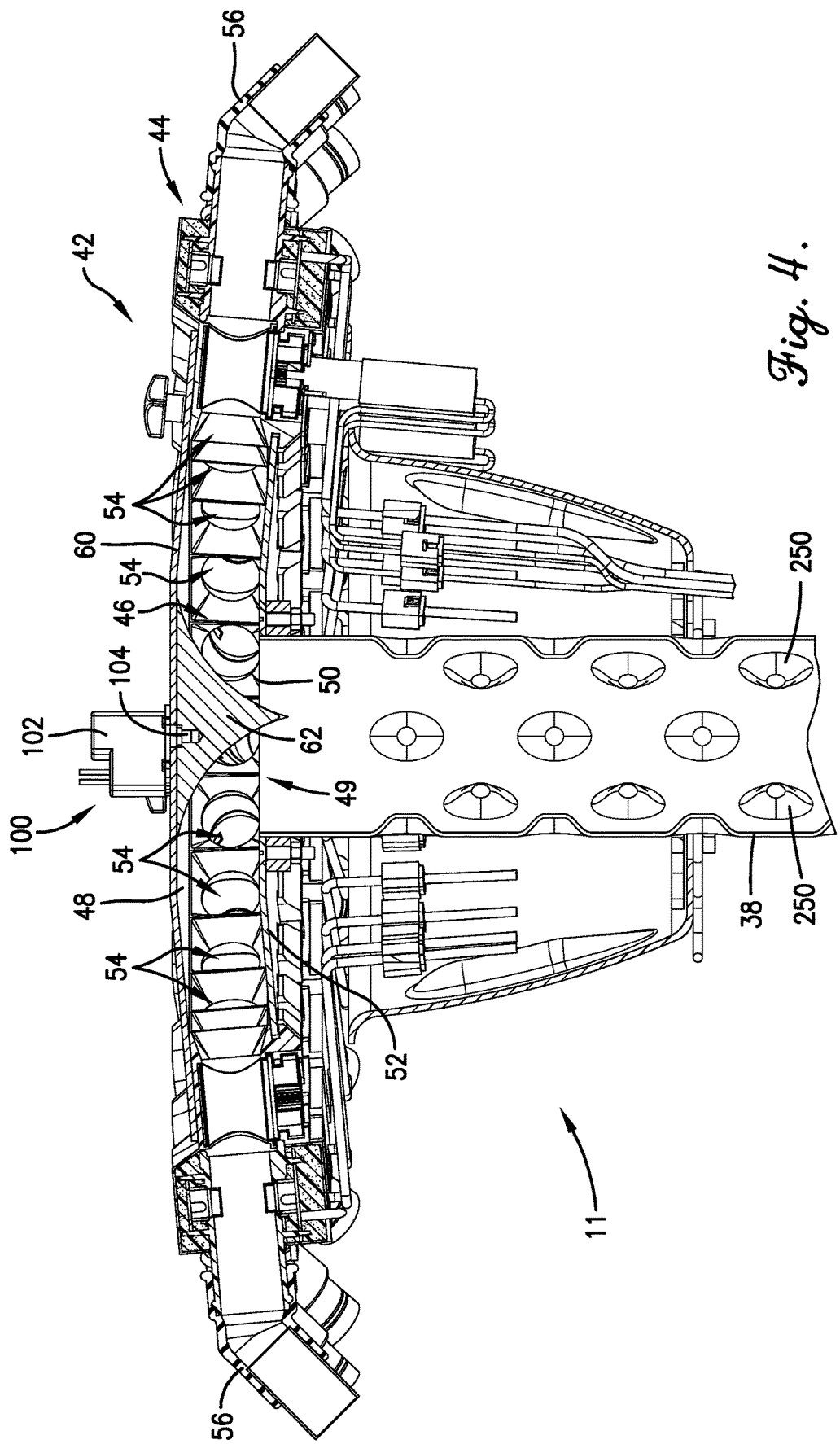
FIG. 4 is a fragmentary vertical cross-sectional view through the upper end of the seed distribution tower taken from FIG. 3, particularly illustrating embodiments of an air-flow adjustment system for adjusting the flow of seed through the seed distribution tower.

With reference to FIG. 4, in general terms, distribution head 42 has an exterior 44 and a hollow interior 46. The interior 46 may be defined by a plenum chamber 48 that communicates with the upper end of upright conduit 38 via an eased inlet 49 that may be formed as a circular opening 50 in a floor 52 of plenum chamber 48. The circular opening 50 may surround the upper end of upright conduit 38 and be generally coaxially aligned therewith.

A series of discharge outlets 54 within interior 46 extend circumferentially about the outer periphery of the plenum chamber 48 in communication therewith and are arranged on generally horizontal axes that project radially outwardly from the central axis of opening 50, in the nature of spokes of a wheel. A corresponding number of elbow fittings 56 are disposed around the exterior 44 of head 42 and are coupled with corresponding discharge outlets 54. The fittings 56 are configured to attach to the corresponding secondary hoses 35 that lead to the openers 22 (See FIGS. 1 and 2).

In some embodiments, each of the discharge outlets 54 may include a sensor 76 for detecting the movement or non-movement of seeds through the discharge outlet 54. In certain of the exemplary embodiments shown in the drawings, the sensors 76 may be configured to be incorporated as part of the discharged outlet 54 with which it is associated. However, in other embodiments, the sensors 76 may be positioned upstream from the discharge outlet 54 (e.g., in the distribution head 42 or in the upright conduit 38). Alternatively, the sensors 76 may be positioned downstream from the discharge outlet 54 (e.g., in the secondary hoses 35 or in, on, and/or adjacent to the openers 22). Each sensor 76 may comprises an optical sensor, although a variety of other types of sensors could be utilized, such as, for example, an audio sensor, a pressure sensor, airflow sensor, or an impact sensor. Accordingly, the sensors 76 may comprise a pair of photocells arranged in diametrically opposed locations for transmitting a light beam across discharge outlet 54. One of the cells may be a sender and the other may be a receiver. Breaking of the light beam by moving seeds may be utilized to confirm the amount of seed being transported through the discharge outlet 54 as part of the associated secondary stream. The sensors 76 may be communicatively coupled with an appropriate control system of the seeder 10, as will be described in more detail below.

Figure 5:
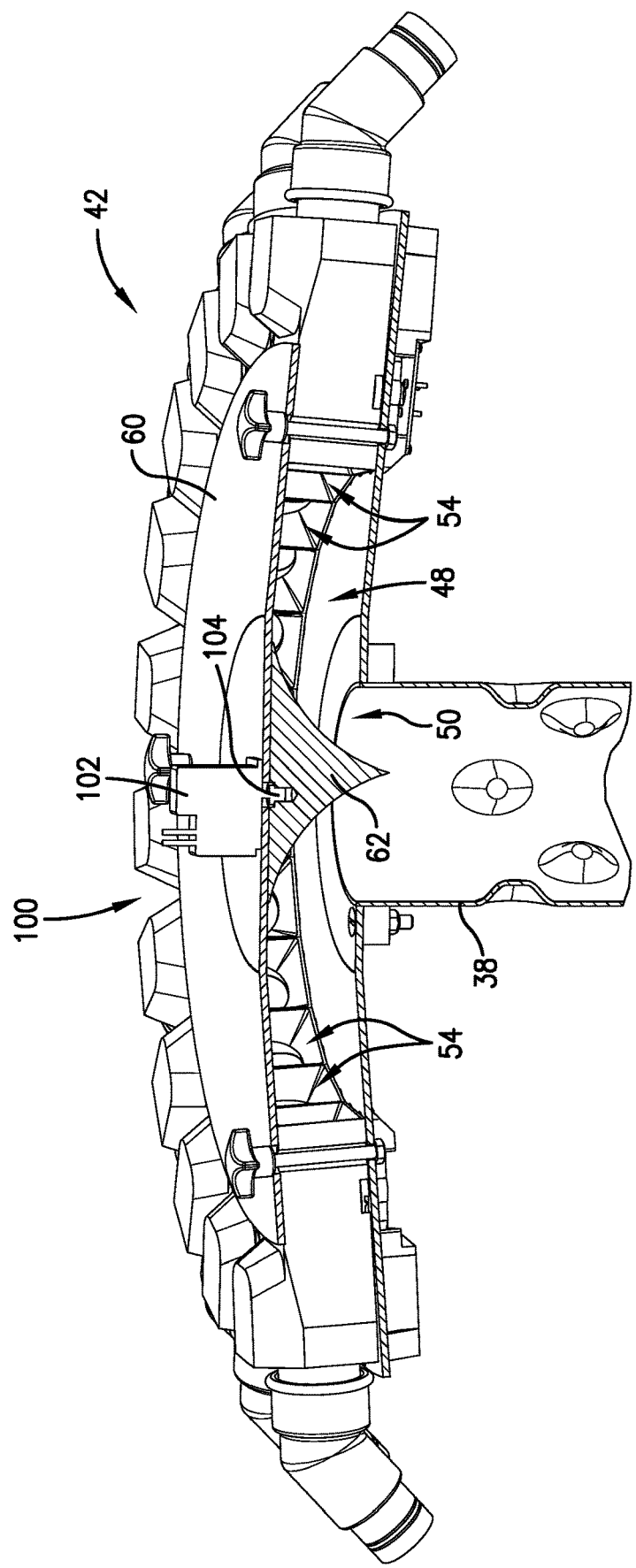
FIG. 5 is another vertical cross-sectional view through the upper end of the seed distribution tower taken from FIG. 3, particularly illustrating embodiments of an air-flow adjustment system in the form of a shiftable deflection assembly comprising an inverted cone movable by an actuator.
Figure 6:
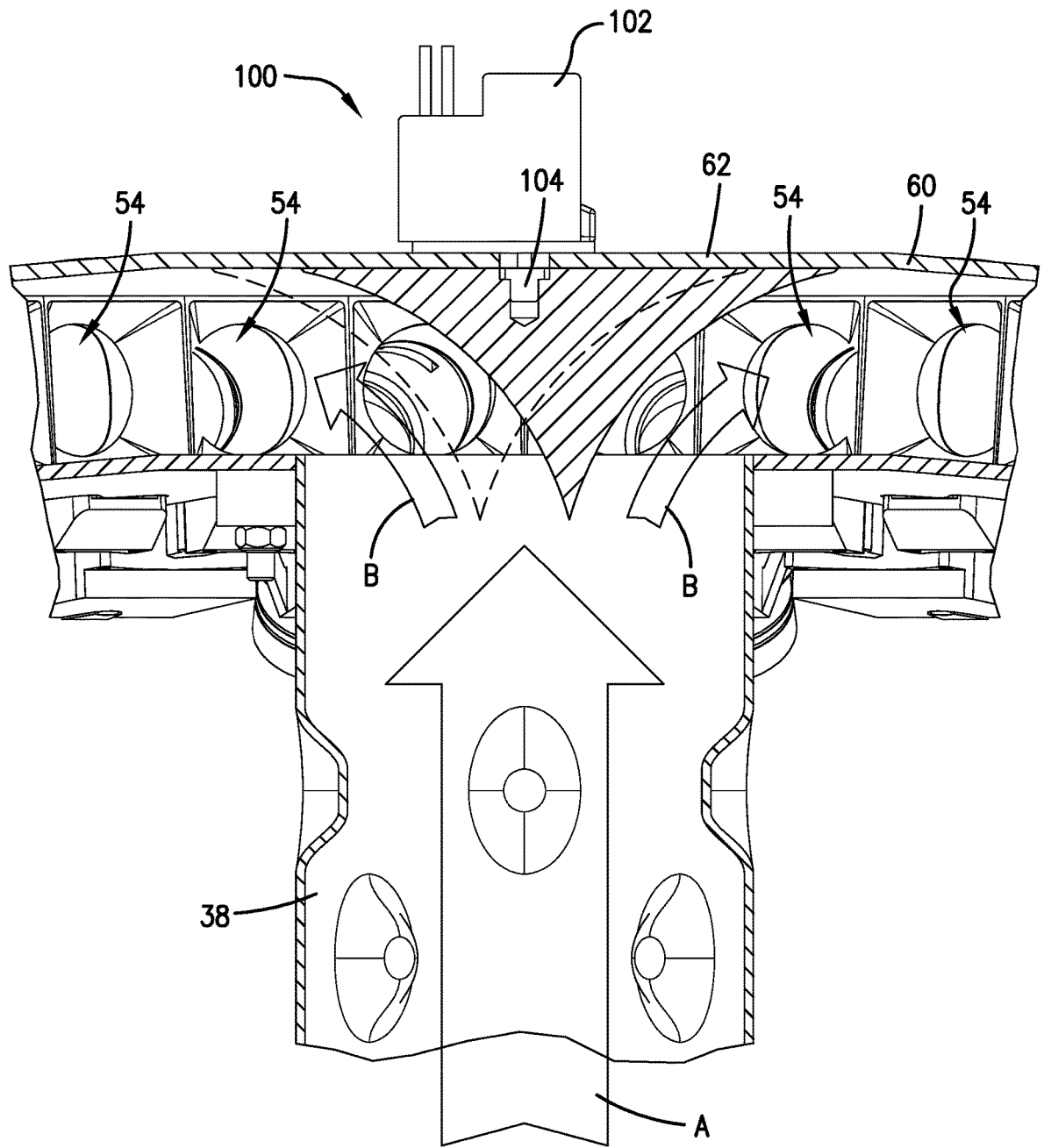
FIG. 6 is an enlarged view of the cross-sections of FIG. 4, particularly illustrating an inverted cone being shifted in a leftward direction, as illustrated in broken line, by an actuator to adjust a flow of seed through the distribution tower.

The plenum chamber 48 of the distribution head 42 includes a top wall 60 that is specially configured to cause the incoming primary stream of air and seeds to effectually transition from vertical to horizontal and split into the desired secondary streams. In this respect, an inverted, transition cone 62 (hereinafter the "cone 62") may be connected to an extend downward from the top wall 60 into the plenum chamber 48. For instance, as shown in FIGS. 4 and 5, the cone 62 may extend down from the top wall 60 such that the cone 62 is pointed generally in the direction of the upright conduit 38 and opening 50. However, in some embodiments, a central axis of the cone 62 may be offset from a central axis of the upright conduit 38 and opening 50. Preferably, the cone 62 may be sized that its tip projects downwardly into and slightly beyond opening 50, terminating within the upper end of upright conduit 38.

With the seeder 10 described above, each distribution tower 11 is configured to receive a primary stream of seed pneumatically conveyed from hopper 28. The distribution tower 11 then distributes the seed upward through the upright conduit 38 to the distribution head 42. The seed will flow through the plenum chamber 48 of the distribution head 42 and is split into a plurality of secondary streams to be discharged via the plurality of radially positioned discharge outlets 54. Thus, it should be understood that the distribution head 42 is configured to split the primary stream of air and seed into a plurality of secondary streams of air and seed that exit the distribution head 42 through the discharge outlets 54. The secondary hoses 35 (which are connected to the outer ends of the discharge outlets 54) can, thus, transport the seed from each of the discharge outlets 54 to the openers 22 that deposits the seed into or onto the ground.

In certain embodiments, it may be necessary to adjust how seed flows through the distribution tower 11. As such, embodiments of the present invention provide multiple configurations of a seed-flow adjustment system for adjusting the distribution of seed flow through the distribution tower and, particularly, between the secondary streams. In some embodiments, the seed-flow adjustment system may be used to ensure that seed is uniformly distributed between the secondary streams. However, in other embodiments, the seed-flow adjustment system may be used to selectively direct more seed or less seed to one or more of the secondary streams. As described in detail below, the seed-flow adjustment system may comprise a seed deflection assembly and/or an airflow control assembly which can be used to adjust the distribution of seed flowing through the distribution tower 11 and through the secondary streams. The seed deflection assembly may, in some embodiments, be any element, or configuration of elements, that physically contacts at least a portion of the seeds flowing through the distribution tower 11 to alter the trajectory or flow of the seeds upstream of the discharge outlets 54. The airflow control assembly may, in some embodiments, be any element, or configuration of elements, that modifies the flow of seed (and/or the flow of air carrying the seed) to alter the flow of the seeds within or downstream of the discharge outlets 54.

In more detail, embodiments of the present invention may include an adjustable seed deflection assembly for modifying the flow of seed traveling through the distribution tower 11. When the adjustable seed deflection assembly is actuated, or otherwise has its position shifted, a deflection pattern of the seeds in the distribution tower 11 can be altered, so as to change the distribution of seeds flowing from the primary stream (which passes through the upright conduit 38) into the secondary streams (which passes through the discharge outlets 54). Certain embodiments of the present invention may provide for the adjustable seed deflection assembly to be positioned upstream from the discharge outlets 54, such as in the distribution head 42 and/or in the upright conduit 38 of the distribution tower 11.

A first embodiment of a seed-flow adjustment system employing an adjustable seed deflection assembly 100 is illustrated in FIGS. 3-6. Broadly, the seed deflection assembly 100 may comprise the inverted cone 62 extending downward from the top wall 60 of the distribution head 42 and into the plenum chamber 48. The seed deflection assembly 100 may additionally include one or more actuators 102 for shifting a position of the cone 62. In more detail, as illustrated in FIG. 3, the top wall 60 may comprise lid that is removable from the remaining components of distribution head 42. The top wall 60 may be secured in place on the distribution head 42 via one or more hand-adjustable fasteners. The actuator 102 may comprise an electrically powered rotary actuator the is secured to a top side of the top wall 60 and that includes a rotary post 104 (See FIGS. 4 and 5) that extends down through the top wall 60 into rigid engagement with the cone 62. The cone 62 may not be directly secured in rigid engagement with the top wall 60, such that actuation of the actuator 102 may cause the rotary post 104 to rotate and, thus, a rotation of the cone 62 within the interior 46 of the distribution head 42. As a result, the position of the cone 62 can be shifted with respect to the upright conduit 38. However, the actuator 102 may not cause the top wall 60 to rotate. As a result, a position of the cone 62 within the plenum chamber 48 can be changed by way of rotation imparted by the actuator 102 (in embodiments in which the actuator 102 comprises a rotary actuator). Alternatively, embodiments may provide for the seed deflection assembly 100 to comprise one or more linear-type actuators connected to the cone 62, in which case the actuators 102 may laterally shift the position of the cone (e.g., forward, rearward, leftward, rightward) within the plenum chamber 48, such that the position of the cone 62 can be shifted with respect to the upright conduit 38.

In general, the cone 62 is provided within the distribution tower 11 to cause the incoming primary stream of air and seeds flowing in a generally upward, vertical trajectory through the upright conduit 38 to transition to a lateral, horizonal trajectory of the plurality of secondary streams. As such, the primary stream can be split into a plurality of secondary streams that exit the distribution tower 11 through the plurality of discharge outlets 54. The cone 62 may, in some embodiments, be normally positioned centrally with respect to the upright conduit 38, so as to split the primary stream of seed generally evenly and uniformly into secondary streams of seed, which can then be passed generally evenly to the individual openers 22 via the secondary hoses 35. However, embodiments of the present invention provide for the position of the cone 62 to be shifted so as to adjust the distribution of seed that is directed to the secondary streams in either a uniform and a non-uniform manner.

As indicated above, for example, the seed-flow adjustment system may include the seed deflection assembly 100 comprising the actuator 102, which can shift the position of the cone 62 by rotating the cone 62 with respect to the upright conduit 38. In some embodiments, a central, longitudinal axis of the cone 62 (which may extend through the tip of the cone 62) may be offset from a central longitudinal axis of the upright conduit 38, such that rotation of cone 62 allows the position of the cone 62 to be adjusted with respect to the upright conduit 38. Such a change of position may be facilitated by the rotary post 104 extending down through the top wall 60 at a position that is offset from the central longitudinal axis of the cone 62. In such embodiments, the axis of rotation of the cone 62 may be offset from the central, longitudinal axis of the cone 62. As a result, the cone 62 may be rotated around the interior 46 of the distribution head 42, such that the position of the cone 62 may be shifted with respect to the upright conduit 38.

In some alternative embodiments, the cone 62 may be rigidly secured to the top wall 60 (or a portion of the top wall 60), and the actuator 102 may simultaneously shift the positions of the cone 62 and the top wall 60 (or a portion of the top wall 60). For example, in some embodiments, the top wall 60 may include an inner portion and an outer portion, with the inner portion being shiftable relative to the outer portion. In such embodiments, the actuator 102 may be configured to simultaneously shift both the positions of the inner portion of the top wall 60 and the cone 62, such that the position of the cone 62 can be shifted with respect to the upright conduit 38.

By shifting/adjusting the position of the cone 62 with respect to the upright conduit 38, an adjustment to the distribution of seed flow between the secondary streams flowing through the discharge outlets 54 can be made. With reference to FIG. 6, a primary stream "A" of air and seed is illustrated by the vertical arrow extending upward through the upright conduit 38. The cone 62 deflects the primary stream of air and seed into a plurality of generally horizontal secondary streams "B" of air and seed. Each of the secondary streams is generally associated with a discharge outlet 54, such that the air and seed within a secondary stream can be discharged from the distribution tower 11 through a given discharge outlet 54 and a correspond secondary hoses 35 to one of the openers 22 for planting. Beneficially, however, embodiments of the present invention provide for the actuator 102 to shift a position of the cone 62 to modify the flow of seed being distributed from the primary stream 'A' into the secondary streams B.

As an example, and with reference to FIG. 6, the actuator 102 may shift the position of the cone 62 rightward (as illustrated by the shifting of the cone 62 from the broken line position to the solid line position), which simultaneously (i) restricts the flow of seed to the secondary streams through the discharge outlets 54 on the right side of the distribution head 42, and (ii) increases the flow of seed to the secondary streams on the left side of the distribution head 42. Such an adjustment may be beneficial for instance, if it was determined that the openers 22 associated with the secondary streams (passing through the discharge outlets 54 and secondary hoses 35) on the left side of the distribution head 42 were not receiving an adequate amount of seed. Such a determination may be made by a control system, which as will be described in more detail below may include various sensors configured to sense the number and/or flow rate of seeds included in each secondary stream. Although, the above example illustrated the cone 62 being shifted rightward with respect to the view of the distribution head 42 shown in FIG. 6, it should be understood that embodiments provide for the cone 62 to have its positions shifted where necessary with respect to the upright conduit 38 to ensure proper flow of seed through the secondary streams. In some embodiments, it may be necessary for each of the secondary streams to have a generally even, consistent, or uniform flow of seed. In alternate embodiments, it may be necessary for certain secondary streams to have more or less seed flow than other secondary streams. Regardless embodiments of the present invention provide for such adjustment using the seed-flow adjustment system employing an adjustable seed deflection assembly, such as seed deflection assembly 100 discussed above.

Figure 7:
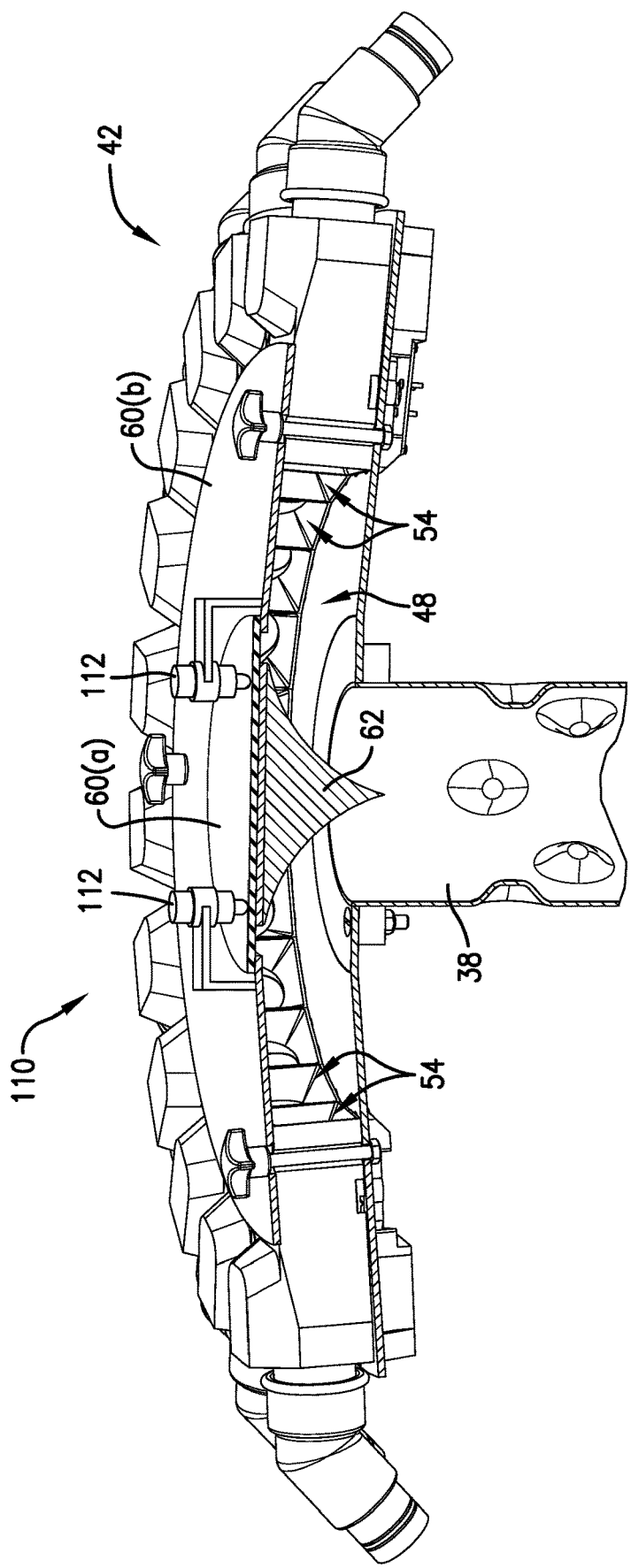
FIG. 7 is a vertical cross-sectional of a seed distribution tower, particularly illustrating another embodiment of an air-flow adjustment system in the form of a shiftable deflection assembly comprising an inverted cone movable by a plurality of actuators forming a gimbal.
Figure 8:
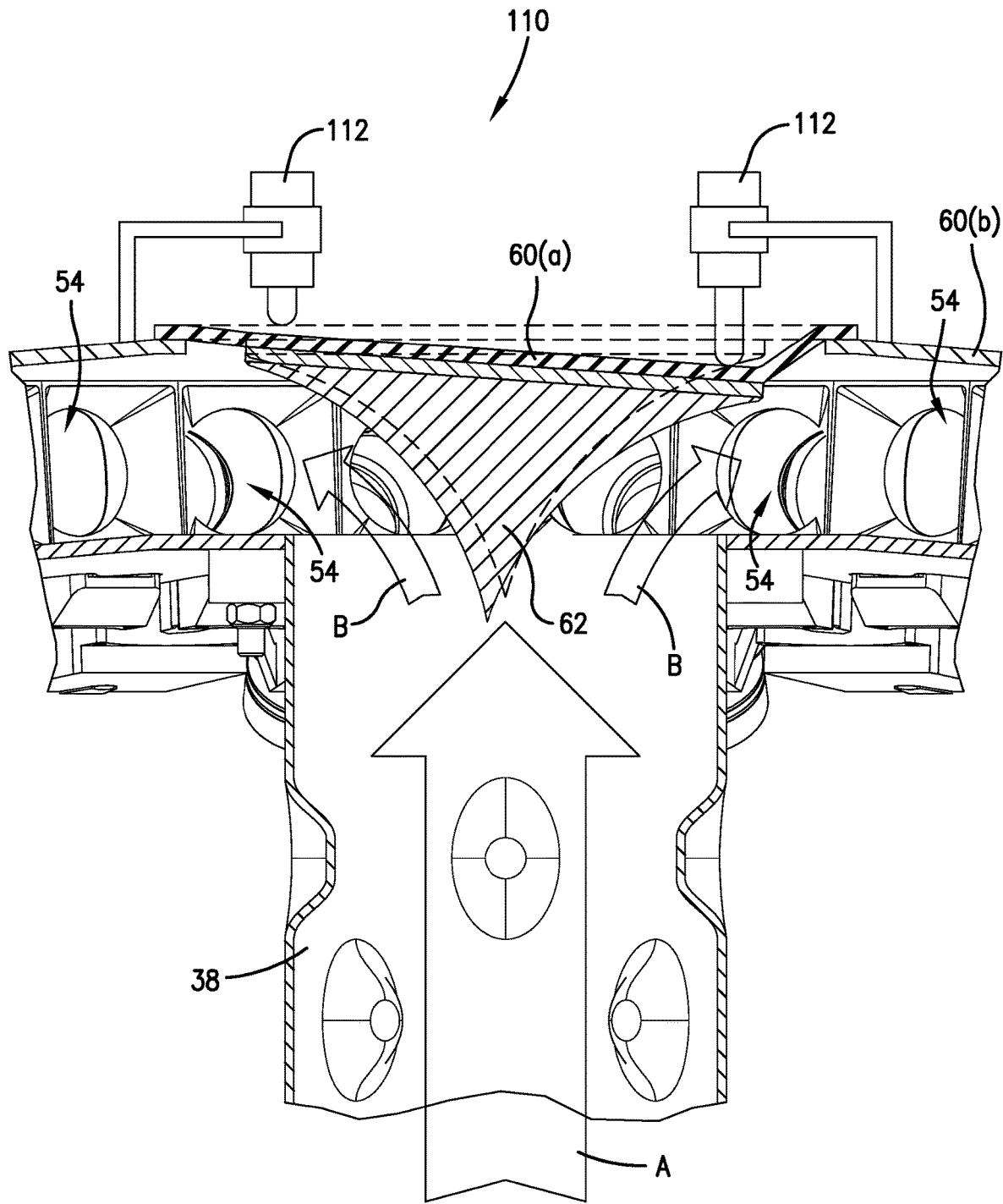
FIG. 8 is an enlarged cross-sectional view of the seed distribution tower of FIG. 7, particularly illustrating the inverted cone being shifted in a rightward direction, as illustrated by the broken line, by the plurality of actuators to adjust a flow of seed through the distribution tower.

In additional embodiments, the seed-flow adjustment system may include seed deflection assembly 110, as illustrated in FIGS. 7 and 8. The seed deflection assembly 110 may include the cone 62 as was described above. However, the cone 62 may be rigidly secured to the top wall, and particularly to an inner portion 60(*a*) of the top wall of the plenum chamber 48 of the distribution head 42. The inner portion 60(*a*) of the top wall may be positioned connected to the outer portion 60(*b*) of the top wall at a position above or below the outer portion 60(*b*), such that a position of the inner portion 60(*a*) (as well as the position of the cone 62) may be shifted with respect to the outer portion 60(*b*). As illustrated in FIG. 8, the inner portion 60(*a*) of the top wall may be connected to the outer portion 60(*b*) via a flexible membrane or gasket, which permits he inner portion 60(*a*) to shift its position with respect to the outer portion 60(*b*), but which maintains pneumatic integrity of the distribution head 42. The shifting of the inner portion 60(*a*) of the top wall and the cone 62 may be facilitated via one or more actuators 112 that are configured as a gimbal system. Specifically, the seed deflection assembly 110 may include two or more linear actuators 112 mounted to a top surface of the inner portion 60(*a*) of the top wall so as to be capable of adjusting the angular orientation of the inner portion 60(*a*) and/or the cone 62 with respect to the outer portion 60(*b*) and the upright conduit 38. In some embodiments, the actuators 112 may be secured to the outer portion 60(*b*) of the top wall via brackets.

As illustrated in FIG. 8, the actuators 112 may shift the orientation or the angular position of the inner portion 60(*a*) of the top wall and the cone 62 with respect to the outer portion 60(*b*) and the upright conduit 38. Specifically, the tip of the cone 62 is shown shifted leftward (as illustrated by shifting of the inner portion 60(*a*) and the cone 62 downward and leftward from the broken line position to the solid line position), which simultaneously (i) restricts the flow of seed to the secondary streams through the discharge outlets 54 on the left side of the distribution head 42, and (ii) increases the flow of seed to the secondary streams on the right side of the distribution head 42. Such an adjustment may be beneficial for instance, if it was determined that the openers 22 associated with the secondary streams (passing through the discharge outlets 54 and secondary hoses 35) on the right side of the distribution head 42 were not receiving an adequate amount of seed. Such a determination may be made by a control system, which as will be described in more detail below may include various sensors configured to sense the number and/or flow rate of seeds included in each secondary stream.

In even further alternatives, the top wall 60 and the cone 62 may be held stationary, and the seed-flow adjustment system (e.g., via a gimbal-type system) may be configured to shift a position/orientation the remaining portions of the distribution tower 11 (e.g., the upright conduit 38 and/or the remaining component of the distribution head 42). As such, the position of the cone 62 can be adjusted with respect to the upright conduit 38 so as to adjust the flow of seed between the secondary streams flowing through the discharge outlets 54.

Figure 9:
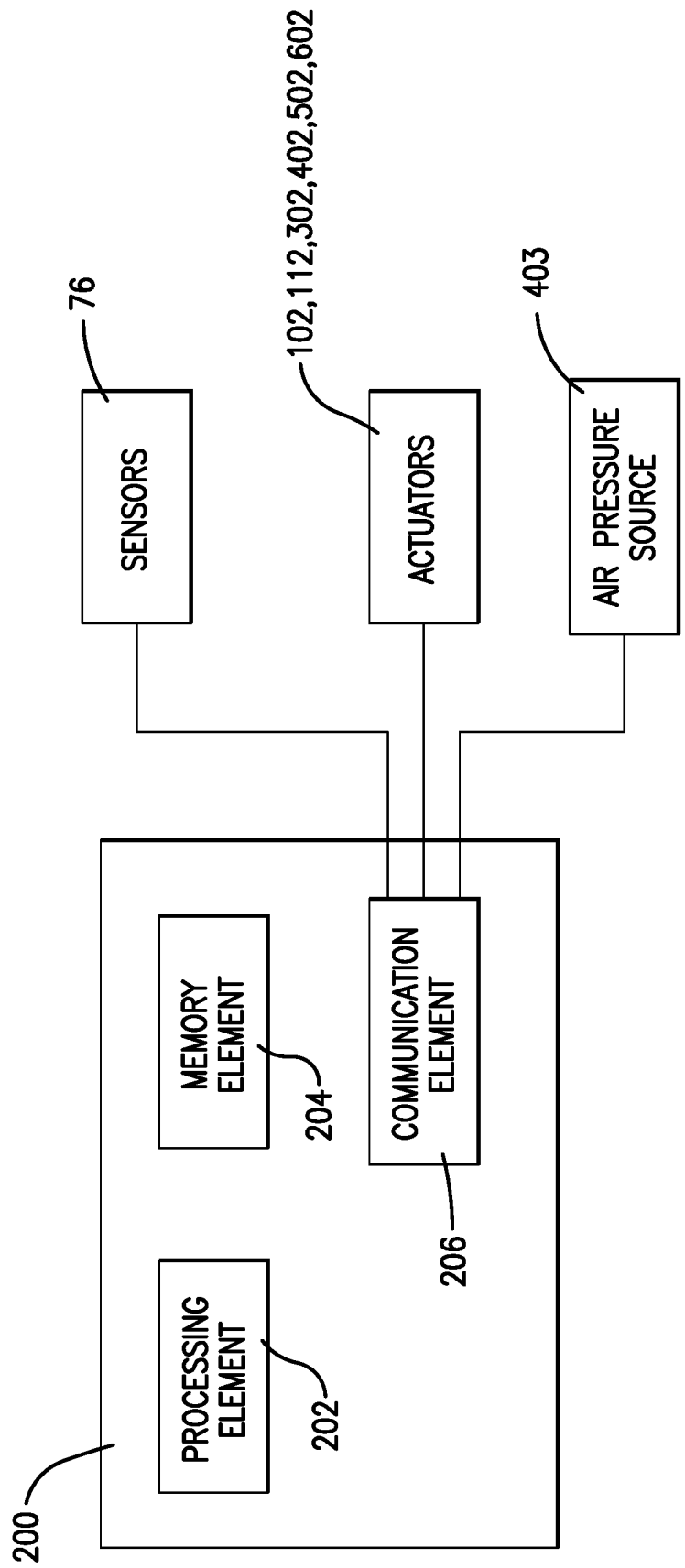
FIG. 9 is a schematic representation of a control system for a seed-flow adjustment system, particularly illustrating the control system being in communication with sensors, actuators, and an air pressure source.

In some embodiments, the seed-flow adjustment system may include a control system 200, as illustrated in FIG. 9, for controlling various components of the seed-flow adjustment system. The control system 200 may comprise any type of control system (e.g., electronic, mechanical, electromechanical, pneumatic, etc.) configured to sense the flow of seed through the seeder 10 and/or through the distribution tower 11, as well as to control components of the seed-flow adjustment system that permit adjustment of seed flowing through the distribution tower 11. For example, as illustrated in FIG. 9, the control system 200 may comprise a computing device with a processing element 202 and a memory element 204. The memory element 204 may comprise a non-transitory computer readable media with a computer program stored thereon. The processing element 202 may execute the computer program to perform the various functions and steps of adjusting the flow of seed through the distribution tower 11, as such functions/steps are described herein. The control system 200 may additionally include a communication element 206 for receiving and/or transmitting information via wired or wireless communication.

Figure 10:
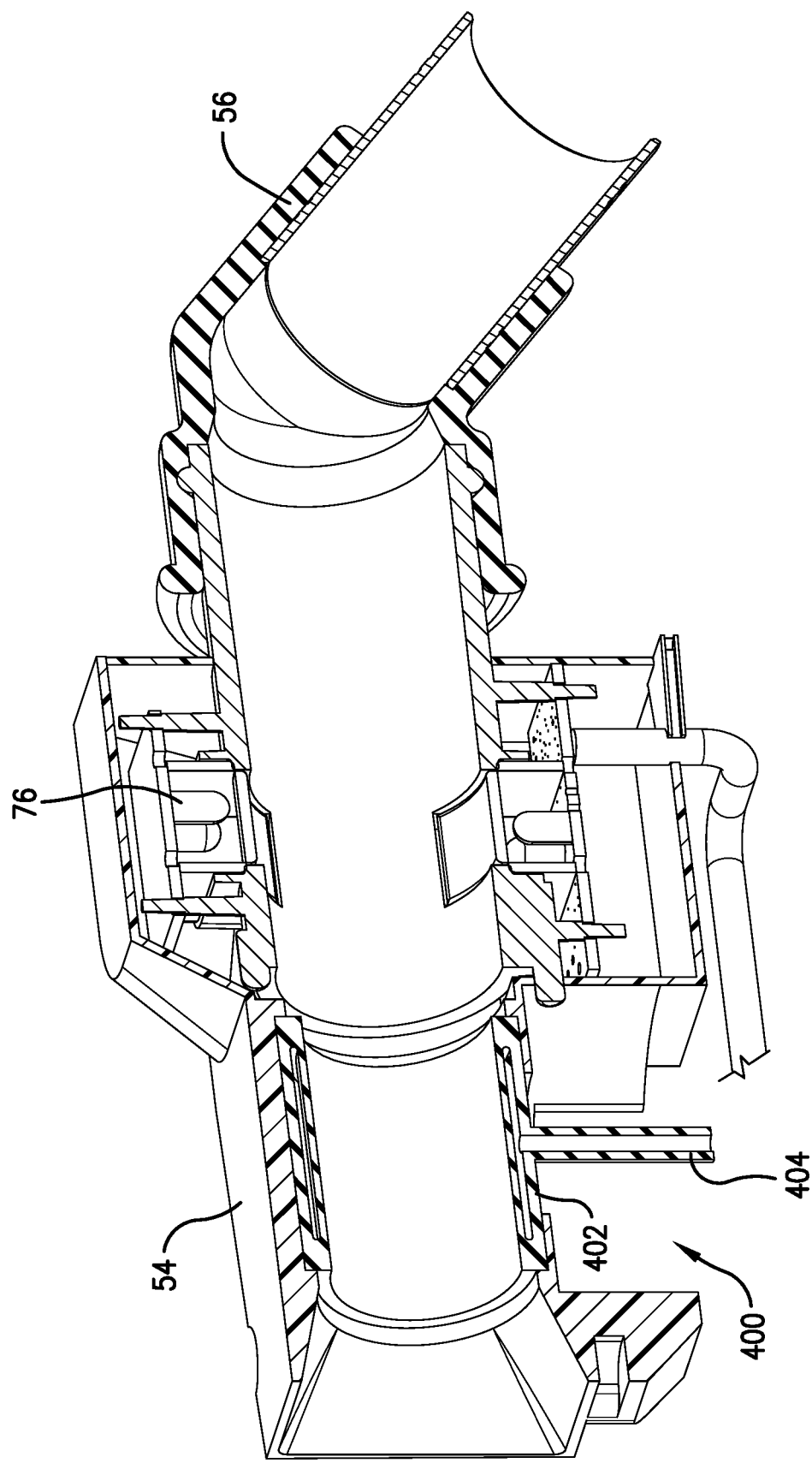
FIG. 10 is a vertical cross section of a discharge outlet for the seed distribution tower from FIG. 3, particularly illustrating embodiments of an air-flow adjustment system in the form of an airflow control assembly comprising an elastic sleeve for adjusting the flow of seed through the discharge outlet, with the elastic sleeve not being pressurized so as to not restrict the flow of seed through the discharge outlet.

For example, as was described previously, the seeder 10 may include one or more sensors 76 for sensing the flow of seed through the seeder 10 and/or through the distribution tower 11. The sensors 76 may be positioned downstream from the upright conduit 38, such as in the plenum chamber 48, within the discharge outlets 54, at the openers 22, and/or within the secondary hoses 35 that connect the discharge outlets 54 with the openers 22. As illustrated in FIG. 10, for instance, each discharge outlet 54 may include a sensor 76 for sensing the number or rate of seed flowing through the discharge outlet 54. As such, the control system 200 can sense whether the secondary streams are not uniform, or otherwise do not have the appropriate flow of seeds flowing therethrough. The control system can then instruct components of the seed-flow adjustment system to adjust the distribution of seed between the secondary streams by, for instance, actuating the one of the above-described seed deflection assemblies 100, 110. Thus, the control system 200 may be configured to control operation of the seed-flow adjustment system (e.g., seed deflection assembly and/or an airflow control assembly) in an automated fashion, without intervention or hand-manipulation by an operator of the seeder 10.

In more detail, seed-flow related information may be transmitted from the sensors 76 to the control system 200 via the communication element 206. Based on the information received from the sensors 76, the control system 200 may control one or more actuators (e.g., actuators 102,112 of the seed deflection assemblies 100, 110) to adjust the flow of seed through the seeder 10 and/or the distribution tower 11, and particularly the flow of seed in the secondary streams passing through the discharge outlets 54. As such, in some embodiments, the control system 200 will comprise a closed-loop control system that is configured to adjust the distribution of seed between the secondary streams based on information or data obtained from the sensors 76.

In some embodiments, sensors 76 may be positioned downstream of the distribution tower 11 (e.g., within the secondary hoses 35) and may be configured to detect the flow of seed in each secondary hose 35. The control system 200 can, based on the data obtained from the sensors 76, adjust the distribution of seed flowing to the secondary streams (as presented by the discharge outlets 54) via the seed-flow adjustment system (e.g., seed deflection assemblies 100, 110). The control system 200 may calculate desired seed outputs according to current seed flow rates, air flow rates, or seed/air flow variance between the secondary hoses 35. In additional embodiments, the control system 200 may adjust the distribution of seed flowing to the secondary streams based on other data, such as may be received from other secondary sensors associated with the seeder 10 that are in communication with the control system 200. Such secondary sensors may comprise global positioning system (GPS) sensors, accelerometers, soil-measuring sensors, or the like. For example, seed flow adjustments between the secondary streams may be based on seed requirement profiles for a field (e.g., previously planted areas with a field, fertile areas within a field, low fertility areas within a field, and unplantable areas within a field), seeder 10 ground speeds and/or paths, opener 22 inclination angles (perhaps taking into consideration uneven terrain), and other inputs. For instance, if the seeder 10 is approaching an area of a field in which seed is not intended to be planted (e.g., a portion of the field over which the right side openers 22 will pass over), the control system 200 may, based on positional data received from a GPS sensor, instruct the components of the seed-flow adjustment system to adjust the flow of seed away from those secondary streams that feed seed to the right side openers 22.

Figure 11:
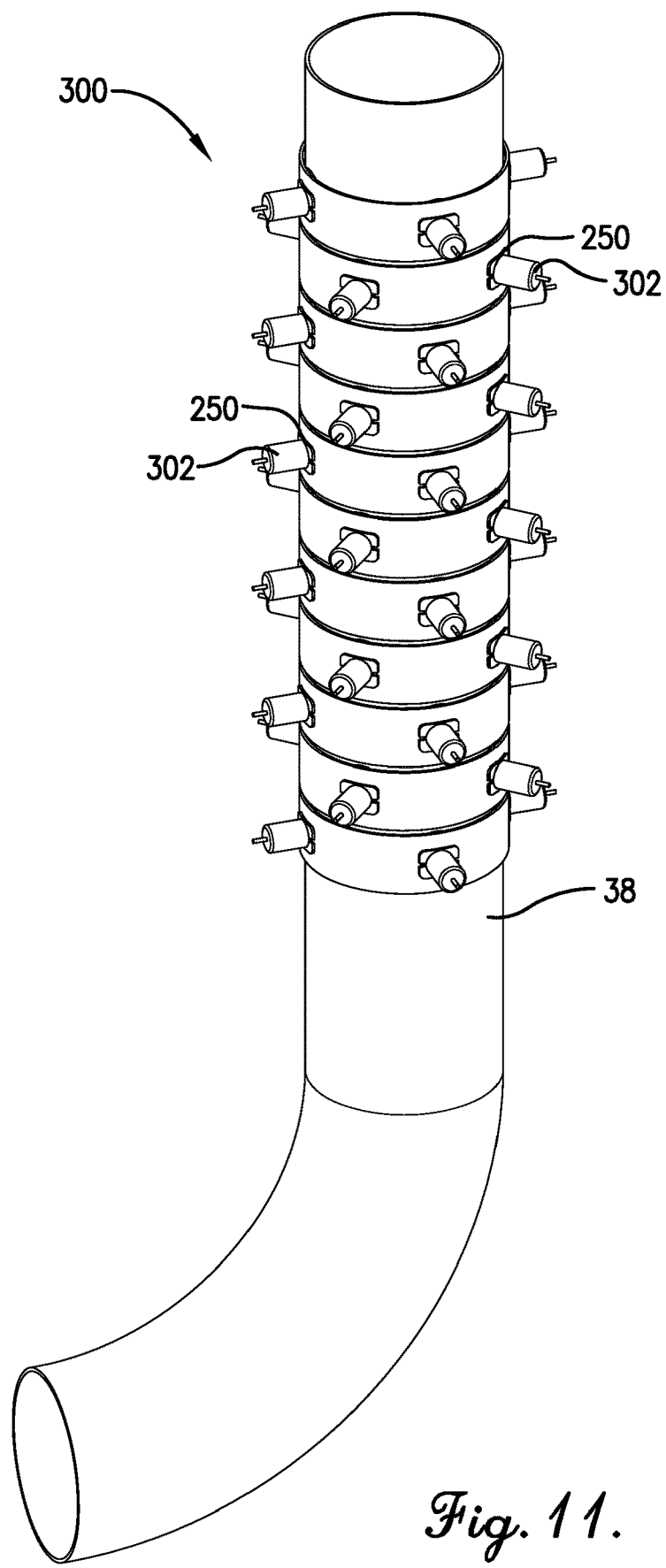
FIG. 11 is a perspective view of an upright conduit from the seed distribution tower from FIG. 3, further including a plurality of actuators in association with flexible diaphragms for selectively forming dimples that extend inward into an interior space of the upright conduit.
Figure 12:
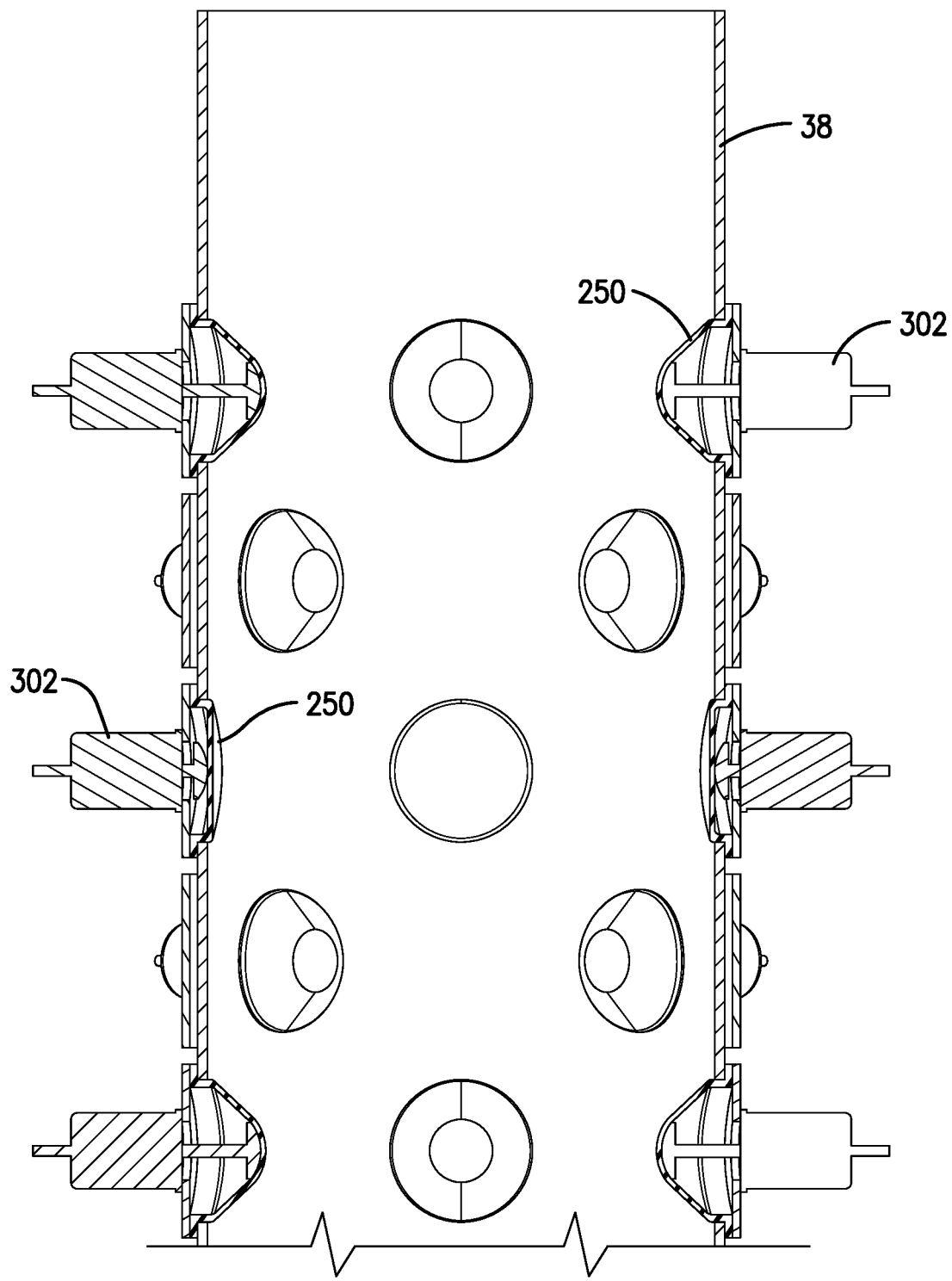
FIG. 12 is a vertical cross-section of the upright conduit from FIG. 11, some of the flexible diaphragms forming dimples that extend inward into the interior space of the upright conduit.

Returning to FIGS. 3 and 4, in some embodiments, the upright conduit 38 may be provided with a plurality of dimples 250 that form interior projections extending inward into the interior space of the upright conduit 38. Such dimples 250 may be disposed about the upright conduit so as to be impinged by seeds moving upward along the primary stream to aid in randomly scattering the seeds in a generally event distribution as the seeds approach the upper end of upright conduit 38. In another embodiment of the present invention, the distribution tower 11 may include a seed-flow adjustment system in the form of seed deflection assemblie 300, as illustrated in FIGS. 11 and 12, which comprises an actuator 302 associated with one or more dimple-forming elements 250 on the upright conduit 38. The dimple-forming elements 250 may be formed as flexible/elastic diaphragms (e.g., formed from rubber or a rubber-like material) that extend across a portion of an interior surface of the upright conduit 38, as perhaps best illustrated by FIG. 12. The actuators 302 may comprise linear actuators, which are configured to selectively force the diaphragms of the dimple-forming elements 250 inward into the interior space of the upright conduit 38. Thus, when an actuator 302 is activated, the corresponding dimple-forming elements 250 is expanded inward into the interior space of the upright conduit 38 so as to form a dimple that impinges on the flow of seed through the upright conduit 38, thereby adjusting the flow of seed within the primary stream. When an actuator 302 is not activated, the corresponding dimple-forming elements 250 is not expanded, and the diaphragm remains generally aligned with the inner surface of the upright conduit 38 so as to not impinge on the seed flowing through the upright conduit 38. Each of the actuators 302 may be controlled by the control system 200, as illustrated by FIG. 9.

The actuators 302 may be selectively actuated so that one or more of the dimple-forming elements 250 can be extended into the interior space of the conduit 38 in various arrangements. In some embodiments, the actuators 302 may be selectively actuated so that one or more of the dimple-forming elements 250 can be extended into the interior space of the conduit 38 to form various patterns that affect the flow of seed through the primary stream, which can in turn, affect the distribution of seed between the secondary streams. For example, one or more groups of actuators 302 may be selectively actuated so as to cause the one or more corresponding groups of dimple-forming elements 250 to be extended into the interior space of the conduit 38, thereby adjusting the resulting distribution of the seed flowing through the primary stream, as well as the distribution of the seed transitioning from the primary stream to the secondary stream within the distribution head 42.

Turning to other embodiments of the present invention, the seed-flow adjustment system may include an airflow control assembly for adjusting the distribution of seed flowing between the secondary streams. Such an airflow control assembly may be used instead of, or in addition to, the seed deflection assemblies 100, 110, 300 described above. In general, the airflow control system may include any device or component configured to adjust the rate of air or seed flowing through the secondary streams, and particularly through individual discharge outlets 54 or groups of discharge outlets 54 of the distribution tower 11. For instance, the airflow control system may include one or more airflow adjustment components (e.g., airflow adjuster, airflow restrictors, airflow deflectors, or air vents) located in the distribution head 42, such as in the discharge outlets 54. Alternatively, such airflow adjustment components may be positioned within the secondary hoses 35 downstream from the discharge outlets 54. In even further alternatives, such airflow adjustment components may be positioned within the openers 22, downstream from the discharge outlets 54.

For example, each discharge outlet 54 and/or secondary hose 35 may include or be otherwise associated with an airflow adjuster configured to adjust the volume or rate of airflow passing through the discharge outlet 54 and/or the secondary hose 35. Such an airflow adjuster can, for instance, selectively reduce airflow through the discharge outlet 54 and/or secondary hose 35 by reducing the cross-sectional area/diameter of the discharge outlet 54 and/or secondary hose 35. Alternatively, each discharge outlet 54 and/or secondary hose 35 can include or be otherwise associated with an air vent configured to reduce the volume or rate of airflow passing through the discharge outlet 54 and/or secondary hose 35 by venting air from the discharge outlet 54 and/or secondary hose 35. In general, such an adjustment of volume and/or rate of airflow through the discharge outlet 54 and/or the secondary hose 35 will cause a corresponding adjustment of seed flowing through the discharge outlet 54 and/or the secondary hose 35. For example, the reduction in airflow passing through a given discharge outlet 54 and/or secondary hose 35 will generally cause a corresponding reduction in the amount of seed flowing through the discharge outlet 54 and/or the secondary hose 35.

FIGS. 10 and 13 show an airflow control assembly in the form of an airflow adjustment element 400 that includes an elastic (e.g., rubber or rubber-like material) bladder, tube, or sleeve 402 positioned within a discharge outlet 54. The sleeve 402 may alternatively be configured as a hollow, cylindrical pressurizable case. The airflow adjustment element 400 may generally function as a soft-seal valve for restricting the flow of air and seed through the associated discharge outlet 54 and, thus, the associated secondary stream. In some embodiments, each of the discharge outlets 54 may include an elastic sleeve 402 for restricting the flow of air and seed through the associated discharge outlet 54 and, thus, the associated secondary stream (it being understood that one secondary stream passes through each of the discharge outlets 54). The elastic sleeves 402 may be pneumatically connected to a positive air pressure source, such as an air pump or fan, via a pneumatic conduit 404. In some embodiments, the airflow adjustment element 400 may include air pressure source 403, which as illustrated by FIG. 9, may be controlled by the control system 200 so as to selectively apply and retract a positive air pressure to the elastic sleeve 402

Figure 13:
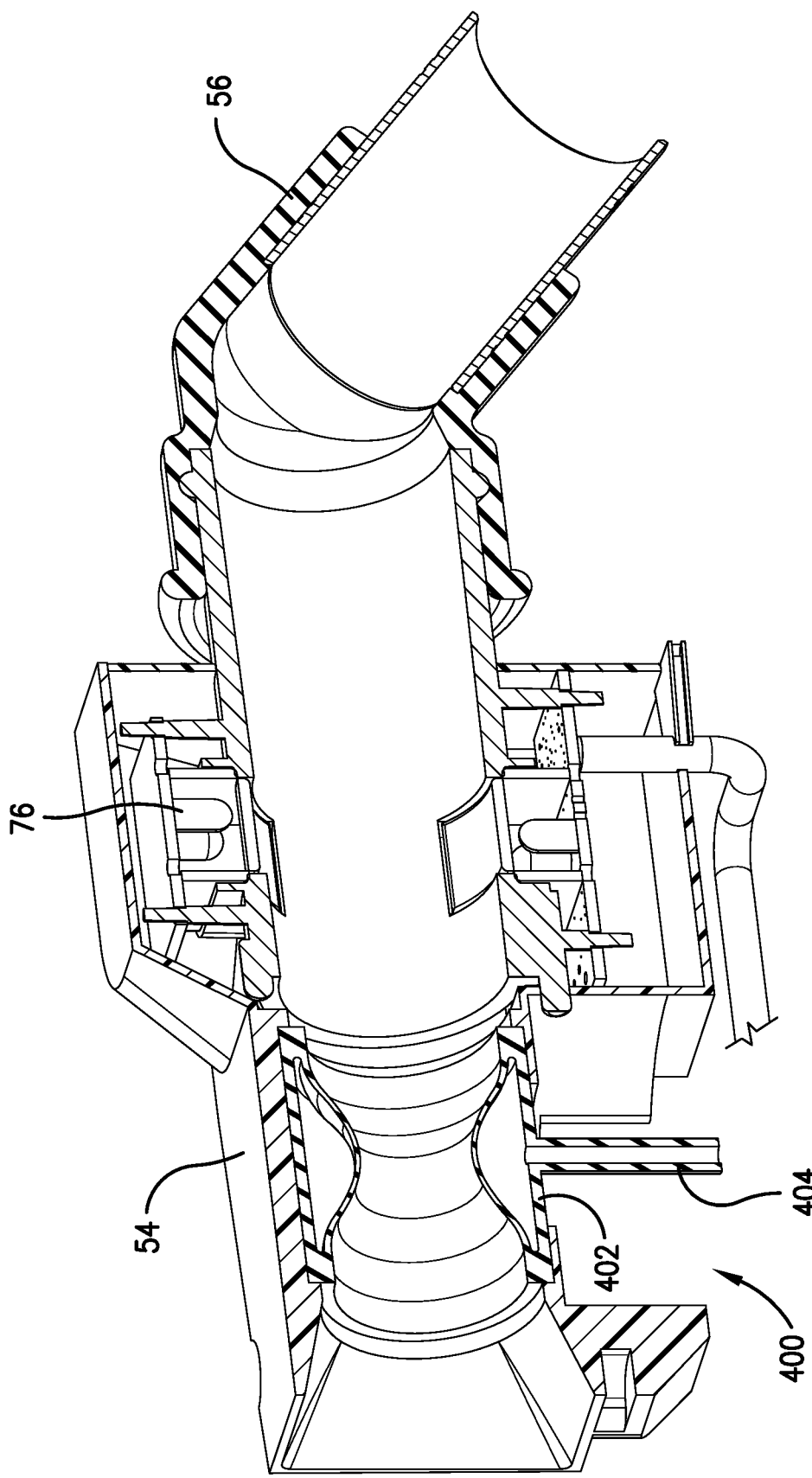
FIG. 13 is another vertical cross section of the discharge outlet from FIG. 11, particularly illustrating the elastic sleeve being pressurized so as to restrict the flow of seed through the discharge outlet.

Applying a positive air pressure to the sleeve 402 will cause the sleeve 402 to expand, thereby causing the open cross-section area/diameter of the sleeve 402 and, thus, of the discharge outlet 54 to reduce (see, e.g., in FIG. 13). Such a reduction in the open cross-section area/diameter of the discharge outlet 54 will cause a corresponding reduction in the flow of air and/or seed through the discharge outlet 54, thereby restricting the flow of the respective secondary. In some embodiments, the airflow and/or the flow of seed within the secondary stream of each given discharge outlet 54 will not be completely restricted or cut-off. Specifically, for any one of the discharge outlets 54 that includes airflow adjustment element 400, the open cross-section area/diameter of the sleeve 402 and, thus, the discharge outlet 54 may never be reduced to zero, which would completely cut off the flow the secondary streams through the discharge outlet 54. In some specific embodiments, the open cross-section area/diameter of the sleeve 402 and, thus, the discharge outlet 54 may not be restricted by more than 10%, more than 25%, more than 33%, more than 50%, more than 66%, more than 75%, more than 90%, or more than 95% of the fully open cross-section area/diameter. In additional embodiments, the open cross-section area/diameter of the sleeve 402 and, thus, the discharge outlet 54 may be restricted between 5 and 95%, between 5 and 90%, between 5 and 75%, between 5 and 50%, between 5 and 25%, or between 5 and 15% of the fully open cross-section area/diameter. Nevertheless, in still other embodiments, the flow of the secondary stream through one or more one or more given discharge outlets 54 may be completely restricted or cutoff (i.e., the open cross-section area/diameter of the sleeve 404 and/or the discharge outlet 54 may be reduced to zero).

In addition to the pneumatic sleeve 402 described above, embodiments of the present invention may include an airflow control assembly in the form of an airflow adjustment element 500, as illustrated in FIG. 14. The airflow adjustment element 500 may include an actuator 502 (e.g., a linear actuator) configured to engage with a flexible/elastic diaphragm 504 (e.g., formed from rubber or a rubber-like material) positioned within one of the discharge outlets 54. In some embodiments, each of the discharge outlets 54 may include an actuator 502 and a diaphragm 504. When the actuator 502 is actuated (e.g., extended), the actuator 502 will force the diaphragm 504 into the discharge outlet 54, thereby reducing the open cross-section area/diameter of the discharge outlet 54. As such, actuating the diaphragm 504 will cause the open cross-section area/diameter of the discharge outlet 54 to restrict, thereby restricting the flow of the respective secondary stream (which includes restricting the flow of air and/or seed associated with the secondary stream).

As was noted above, in some embodiments, airflow control assembly may not completely restrict the airflow and/or the flow of seed within the secondary stream of each given discharge outlet 54. Specifically, for any one of the discharge outlets 54 that includes airflow adjustment element 500, the open cross-section area/diameter of the discharge outlet 54 may never be reduced to zero, which would completely cut off the flow the secondary streams through the discharge outlet 54. In some specific embodiments, the open cross-section area/diameter of the discharge outlet 54 may not be restricted by more than 10%, more than 25%, more than 33%, more than 50%, more than 66%, more than 75%, more than 90%, or more than 95% of the fully open cross-section area/diameter. In additional embodiments, the open cross-section area/diameter of the discharge outlet 54 may be restricted between 5 and 95%, between 5 and 90%, between 5 and 75%, between 5 and 50%, between 5 and 25%, or between 5 and 15% of the fully open cross-section area/diameter. Nevertheless, in still other embodiments, the flow of the secondary stream through one or more one or more given discharge outlets 54 may be completely restricted or cutoff (i.e., the open cross-section area/diameter of the discharge outlet 54 may be reduced to zero).

Embodiments of the airflow control system may also include other configurations for adjusting the distribution of seed flowing through the distribution head 42 about the secondary streams. For example, as illustrated in FIG. 15, an embodiment of an airflow control assembly may include an airflow adjustment element 600 comprising an actuator 602 configured to selectively open or close a vent valve 604 associated with one of the discharge outlets 54. In some embodiments, each of the discharge outlets may be associated with its own actuator 602 and vent valve 604. In a standard operating position, the vent valve 604 will be closed, such that the vent valve 604 forms a part of the inner surface of the associated discharge outlet 54. However, upon activation of the actuator 602 (e.g., via a retraction), the actuator will retract the vent valve 604 away from the discharge outlet 54, such that air can be vented from the discharge outlet 54, so as to reduce the airflow of the secondary stream passing through the discharge outlet 54 (which includes reducing the seed flow within such secondary stream). As such, the airflow adjustment element 600 may function as an exhaust port for airflow flowing through the discharge outlet 54. Alternatively, the flow of air and seed passing through the individual secondary streams may also be adjusted via one or more shiftable vanes positioned within the plenum chamber 48 and/or within the discharge outlets 54.

As was noted above, in some embodiments, airflow control assembly may not completely restrict the airflow and/or the flow of seed within the secondary stream of each given discharge outlet 54. Specifically, for any one of the discharge outlets 54 that includes airflow adjustment element 600, the airflow may not be completely vented or reduced, which would completely cut off the flow the secondary streams through the discharge outlet 54. In some specific embodiments, the airflow through the discharge outlet 54 may not be reduced by more than 10%, more than 25%, more than 33%, more than 50%, more than 66%, more than 75%, more than 90%, or more than 95% of a steady state airflow through the discharge outlet 54. In additional embodiments, the airflow through the discharge outlet 54 may be reduced between 5 and 95%, between 5 and 90%, between 5 and 75%, between 5 and 50%, between 5 and 25%, or between 5 and 15% of a steady state airflow through the discharge outlet 54. Nevertheless, in still other embodiments, the flow of the secondary stream through one or more one or more given discharge outlets 54 may be completely reduced (i.e., the air flow is entirely vented off through the airflow adjustment element 600).

In view of the description provided above, the seed-flow adjustment system may be configured to adjust the distribution of seed within the secondary streams by adjusting the positions or orientations of components upstream from the discharge outlets 54 (e.g., via one or more of the seed deflection assemblies). For instance, adjusting the position/orientation of the cone 62 and/or actuation of the diaphragms of the dimple-forming elements 250 within the upright conduit 38 can be used to adjust the distribution of seed transitioning from the primary stream to the secondary streams that flow through the discharge outlets 54. Alternatively, or in addition, the seed-flow adjustment system may be configured to adjust the distribution of seed within the secondary streams by adjusting components within the discharge outlets 54 (e.g., via one or more of the airflow control assemblies). For instance, adjusting one or more of the airflow adjustment elements 400, 500, 600 within the discharge outlets 54 can be used to adjust the distribution of seed within the secondary streams flowing through the discharge outlets 54. Furthermore still, the seed-flow adjustment system may be configured to adjust the distribution of seed within the secondary streams by adjusting components downstream from the discharge outlets 54 (e.g., via one or more of the airflow control assemblies). For instance, adjusting one or more of the airflow adjustment elements 400, 500, 600 positioned within the secondary hoses 35 can be used to adjust the distribution of seed within the secondary streams flowing through the discharge outlets 54.

In certain embodiments, the seed-flow adjustment system (e.g., seed deflection assembly or airflow control assembly) can be used to uniformly or evenly distribute the flow of seed between the secondary streams (e.g., such that each of the secondary streams have generally equal seed flow). In some embodiments, the seed-flow adjustment system may be used to uniformly or evenly distribute the flow of seed between the secondary streams such that each of the secondary streams has a flow of seed that does not deviate from any of the other secondary streams by more than 20%, by more than, 15%, by more than 10%, by more than 5%, or by more than 3%.

Alternatively, the seed-flow adjustment system (e.g., seed deflection assembly or airflow control assembly) can be used to non-uniformly distribute the flow of seed between the secondary streams. For instance, embodiments may be configured such that the secondary streams are defined into two or more groups of secondary streams (e.g., as perhaps defined by the control system 200), and the seed-flow adjustment system can be used to individually distribute specific amounts of seed between each of the groups in the two or more groups of secondary streams. Similarly embodiments may be configured such that the secondary streams are defined into two or more zones of secondary streams (e.g., as perhaps defined by the control system 200), and the seed-flow adjustment system can be used to individually distribute specific amounts of seed between each of the zones in the two or more groups of secondary streams. To accomplish such, for example, the seed-flow adjustment system may be configured to cause the flow rate of seed through at least one discharge outlet 54 to change (increase or decrease) by at least 2 percent, at least 5 percent, or at least 10 percent. In some embodiments, the seed-flow adjustment system will does not cause the flow rate of seed through any of the discharge outlets to change (increase or decrease) by more than 50 percent, 30 percent, or 20 percent. Thus, in certain embodiments, the seed-flow adjustment system may not be configured simply an on/off valve located at the discharge outlets 54. Rather, the seed-flow adjustment system may be configured to provide real-time seed rate adjustments amongst the secondary streams, while air and seed flow amongst all of the secondary streams is maintained greater than zero (i.e., without being completely cutoff).

Having thus described one or more embodiments of the invention, what is claimed as new and desired to be protected by Letters Patent includes the following:

What is claimed is:

1. A distribution tower for conveying particulate material, said distribution tower comprising:

an upright conduit for pneumatically conveying particulate material in a primary stream toward an upper end of said conduit;

a distribution head at the upper end of said conduit, wherein said distribution head comprises a plenum chamber for receiving the primary stream of particulate material from said conduit, and wherein said distribution head further comprises a plurality of discharge outlets for directing particulate material out of said plenum chamber, wherein said distribution head is configured to split the primary stream into a plurality of secondary streams, wherein each of the secondary streams is discharged from said distribution head via one of said discharge outlets; and a flow adjustment system configured to adjust a distribution of particulate material between the secondary streams, wherein said flow adjustment system comprises an airflow control assembly positioned within at least one of the discharge outlets, wherein the airflow control assembly is configured to adjust the distribution of particulate material between the secondary streams without completely restricting the flow of any of the secondary streams through their respective discharge outlet, wherein said airflow control assembly comprises an elastic sleeve positioned within said at least one of the discharge outlets, wherein the elastic sleeve is in pneumatic communication with a positive air-pressure source, wherein pressurization of said elastic sleeve is configured to restrict airflow through said at least one of the discharge outlets.

2. The distribution tower of claim 1, wherein pressurization of said elastic sleeve is configured to restrict airflow through said at least one of the discharge outlets by no more than ninety-five percent.

3. The distribution tower of claim 1, wherein said elastic sleeve is in pneumatic communication with the positive air-pressure source via a pneumatic conduit.

4. The distribution tower of claim 1, wherein the positive air-pressure source comprises an air pump or a fan.

5. A distribution tower for conveying particulate material, said distribution tower comprising:

an upright conduit for pneumatically conveying particulate material in a primary stream toward an upper end of said conduit;

a distribution head at the upper end of said conduit, wherein said distribution head comprises a plenum chamber for receiving the primary stream of particulate material from said conduit, and wherein said distribution head further comprises a plurality of discharge outlets for directing particulate material out of said plenum chamber, wherein said distribution head is configured to split the primary stream into a plurality of secondary streams, wherein each of the secondary streams is discharged from said distribution head via one of said discharge outlets; and a flow adjustment system configured to adjust a distribution of particulate material between the secondary streams, wherein said flow adjustment system comprises an airflow control assembly positioned within at least one of the discharge outlets, wherein the airflow control assembly is configured to adjust the distribution of particulate material between the secondary streams without completely restricting the flow of any of the secondary streams through their respective discharge outlet, wherein said airflow control assembly comprises an elastic diaphragm configured to be selectively extended within said at least one of the discharge outlets to restrict airflow through said at least one of the discharge outlets.

6. The distribution tower of claim 5, wherein said airflow control assembly comprises a linear actuator for extending said elastic diaphragm within said at least one of the discharge outlets.

7. A distribution tower for conveying particulate material, said distribution tower comprising:
an upright conduit for pneumatically conveying particulate material in a primary stream toward an upper end of said conduit;
a distribution head at the upper end of said conduit, wherein said distribution head comprises a plenum chamber for receiving the primary stream of particulate material from said conduit, and wherein said distribution head further comprises a plurality of discharge outlets for directing particulate material out of said plenum chamber, wherein said distribution head is configured to split the primary stream into a plurality of secondary streams, wherein each of the secondary streams is discharged from said distribution head via one of said discharge outlets; and
a flow adjustment system configured to adjust a distribution of particulate material between the secondary streams,
wherein said flow adjustment system comprises an airflow control assembly positioned within at least one of the discharge outlets, wherein the airflow control assembly is configured to adjust the distribution of particulate material between the secondary streams without completely restricting the flow of any of the secondary streams through their respective discharge outlet,
wherein said airflow control assembly comprises a vent valve configured to be selectively opened to vent air flowing through said at least one of the discharge outlets,
wherein said airflow control assembly comprises a linear actuator for selectively opening and closing said vent valve.

8. The distribution tower of claim 1, further comprising a control system including a processing element and a communication element, wherein said control system is configured to control said airflow control assembly.

9. The distribution tower of claim 1, wherein the particulate material comprises seed, and wherein said distribution tower further comprises one or more sensors for sensing seed flowing through the secondary streams.

10. The distribution tower of claim 9, wherein said control system is configured to control operation of said airflow control assembly based on information received from said sensors.

11. A distribution tower for conveying particulate material, said distribution tower comprising:
an upright conduit for pneumatically conveying particulate material in a primary stream toward an upper end of said conduit;
a distribution head at the upper end of said conduit, wherein said distribution head comprises a plenum chamber for receiving the primary stream of particulate material from said conduit, and wherein said distribution head further comprises a plurality of discharge outlets for directing particulate material out of said plenum chamber, wherein said distribution head is configured to split the primary stream into a plurality of secondary streams, wherein each of the secondary streams is discharged from said distribution head via one of said discharge outlets; and
a flow adjustment system configured to adjust a distribution of particulate material between the secondary streams,
wherein said flow adjustment system comprises an airflow control assembly positioned within at least one of the discharge outlets, wherein the airflow control assembly is configured to adjust the distribution of particulate material between the secondary streams without completely restricting the flow of any of the secondary streams through their respective discharge outlet,
wherein said flow adjustment system further comprises a shiftable deflection assembly, and wherein a positional shifting of said deflection assembly is configured to adjust the distribution of particulate between the secondary streams.

12. The distribution tower of claim 11, wherein said deflection assembly comprises a transition cone, wherein said distribution head includes an upper wall, and wherein said transition cone extends from a bottom side of said top wall so as to extend into said plenum chamber.

13. The distribution tower of claim 12, wherein said deflection assembly includes an actuator for shifting a position of said transition cone with respect to said conduit.

14. The distribution tower of claim 11, wherein said deflection assembly comprises a plurality of elastic diaphragms positioned on an interior surface of said upright conduit and configured to be selectively actuated into dimples that extend into an interior space of said conduit.

15. A method of distributing particulate material through a distribution tower, said method comprising the steps of:
(a) pneumatically conveying particulate material in a primary stream upward through an upright conduit to a plenum chamber of a distribution head;
(b) splitting the particulate material of the primary stream into a plurality of secondary streams that each exit the plenum chamber through a discharge outlet; and (c) adjusting, via an airflow control assembly positioned within at least one of the discharge outlets, a distribution of the particulate material among the secondary streams without completely cutting off the flow of any of the secondary streams through their respective discharge outlet, wherein the airflow control assembly comprises an elastic sleeve positioned within the at least one of the discharge outlets, wherein pressurization of the elastic sleeve is configured to restrict airflow through the at least one of the discharge outlets.

16. A method of distributing particulate material through a distribution tower, said method comprising the steps of:
(a) pneumatically conveying particulate material in a primary stream upward through an upright conduit to a plenum chamber of a distribution head;
(b) splitting the particulate material of the primary stream into a plurality of secondary streams that each exit the plenum chamber through a discharge outlet; and
(c) adjusting, via an airflow control assembly positioned within at least one of the discharge outlets, a distribution of the particulate material among the secondary streams without completely cutting off the flow of any of the secondary streams through their respective discharge outlet,
wherein the airflow control assembly comprises an elastic diaphragm configured to be selectively extended within the at least one of the discharge outlets to restrict airflow through the at least one of the discharge outlets.

17. The method of claim 15, wherein the airflow control assembly comprises a vent valve configured to be selectively opened to vent air flowing through the at least one of the discharge outlets.

\* \* \* \* \*